United States Patent
Zhamu et al.

(10) Patent No.: US 10,707,535 B2
(45) Date of Patent: *Jul. 7, 2020

(54) PRODUCTION PROCESS FOR ALKALI METAL-SULFUR BATTERIES HAVING HIGH VOLUMETRIC AND GRAVIMETRIC ENERGY DENSITIES

(71) Applicant: Global Graphene Group, Inc., Dayton, OH (US)

(72) Inventors: Aruna Zhamu, Springboro, OH (US); Bor Z. Jang, Centerville, OH (US)

(73) Assignee: Global Graphene Group, Inc., Dayton, OH (US)

( * ) Notice: Subject to any disclaimer, the term of this patent is extended or adjusted under 35 U.S.C. 154(b) by 267 days.

This patent is subject to a terminal disclaimer.

(21) Appl. No.: 14/998,513

(22) Filed: Jan. 15, 2016

(65) Prior Publication Data
US 2017/0207488 A1    Jul. 20, 2017

(51) Int. Cl.
*H01M 10/0585* (2010.01)
*H01M 10/054* (2010.01)
(Continued)

(52) U.S. Cl.
CPC ..... *H01M 10/0585* (2013.01); *H01M 4/0404* (2013.01); *H01M 4/139* (2013.01);
(Continued)

(58) Field of Classification Search
CPC ...... H01M 4/5815; H01M 4/625; H01M 4/38; H01M 4/1397; H01M 10/0585;
(Continued)

(56) References Cited

U.S. PATENT DOCUMENTS 6,096,454 A * 8/2000 Tran ............... H01M 4/0438
                                            429/231.8
8,828,574 B2  9/2014 Visco et al.
(Continued)

OTHER PUBLICATIONS

PCT/US17/12847 International Search Report and Written Opinion dated Apr. 6, 2017, 10 pages.
(Continued)

*Primary Examiner* — Jimmy Vo

(57) ABSTRACT

Process for producing an alkali metal-sulfur battery, comprising: (a) Preparing a first conductive porous structure; (b) Preparing a second conductive porous structure; (c) Injecting or impregnating a first suspension into pores of the first conductive porous structure to form an anode electrode, wherein the first suspension contains an anode active material, an optional conductive additive, and a first electrolyte; (d) Injecting or impregnating a second suspension into pores of the second conductive porous structure to form a cathode electrode, wherein the second suspension contains a cathode active material (selected from sulfur, lithium polysulfide, sodium polysulfide, sulfur-polymer composite, organo-sulfide, sulfur-carbon composite, sulfur-graphene composite, or a combination thereof), an optional conductive additive, and a second electrolyte; and (e) Assembling the anode electrode, a separator, and a cathode electrode into the battery.

18 Claims, 17 Drawing Sheets

(after consolidation)

(51) Int. Cl.

| | |
|---|---|
| H01M 4/66 | (2006.01) |
| H01M 4/80 | (2006.01) |
| H01M 4/38 | (2006.01) |
| H01M 4/04 | (2006.01) |
| H01M 4/62 | (2006.01) |
| H01M 10/0569 | (2010.01) |
| H01M 4/74 | (2006.01) |
| H01M 10/052 | (2010.01) |
| H01M 4/139 | (2010.01) |
| H01M 4/1395 | (2010.01) |
| H01M 10/0565 | (2010.01) |

(52) U.S. Cl.
CPC ........... *H01M 4/1395* (2013.01); *H01M 4/38* (2013.01); *H01M 4/382* (2013.01); *H01M 4/625* (2013.01); *H01M 4/661* (2013.01); *H01M 4/74* (2013.01); *H01M 4/808* (2013.01); *H01M 10/052* (2013.01); *H01M 10/054* (2013.01); *H01M 10/0569* (2013.01); *H01M 10/0565* (2013.01); *Y02T 10/7011* (2013.01)

(58) Field of Classification Search
CPC .. H01M 4/587; H01M 4/5835; H01M 4/1393; H01M 4/133; H01M 4/808; H01M 4/663; H01M 4/661; H01M 10/054
See application file for complete search history.

(56) References Cited

U.S. PATENT DOCUMENTS

| | | | | |
|---|---|---|---|---|
| 9,960,451 | B1* | 5/2018 | Zhamu | H01M 10/052 |
| 10,026,995 | B2* | 7/2018 | Zhamu | H01M 4/808 |
| 10,170,789 | B2* | 1/2019 | Zhamu | H01M 10/0525 |
| 2003/0113624 | A1 | 6/2003 | Kim et al. | |
| 2012/0088154 | A1 | 4/2012 | Liu et al. | |
| 2013/0040196 | A1 | 2/2013 | Hosoe et al. | |
| 2013/0171339 | A1 | 7/2013 | Wang et al. | |
| 2013/0171502 | A1 | 7/2013 | Chen et al. | |
| 2014/0234702 | A1 | 8/2014 | Zhang et al. | |
| 2014/0272610 | A1 | 9/2014 | Amine et al. | |

OTHER PUBLICATIONS

Chen et al., "Three-dimensional Flexible and Conductive Interconnected Graphene Networks Grown by Chemical Vapor Deposition" Nature Materials (2011) vol. 10, pp. 424-428.

Ji et al., "AHighly Ordered Nanostructured Carbon-Sulphur Cathode for Lithium-Sulphur Batteries" Nature Materials (2009) vol. 8, pp. 500-506.

Chen, Z. et al. "Three-dimensional flexible and conductive interconnected graphene networks grown by chemical vapor deposition," Nat. Mater. 10, 424-428 (2011).

Xiulei Ji, Kyu Tae Lee, & Linda F. Nazar, "A highly ordered nanostructured carbon-sulphur cathode for lithium-sulphur batteries," Nature Materials 8, 500-506 (2009).

U.S. Appl. No. 14/998,523 Final Office Action dated Sep. 14, 2018, 7 pages.

U.S. Appl. No. 14/998,523 Nonfinal Office Action dated Apr. 12, 2018, 8 pages.

U.S. Appl. No. 14/998,523 Non-final Office Action dated Mar. 28, 2019, 7 pages.

U.S. Appl. No. 14/998,523 Final Office Action dated Aug. 2, 2019, 10 pages.

* cited by examiner 5 sheets of chicken wire-shaped metal web (thin, porous 2D structure) properly spaced (front view)

These 5 sheets of thin, porous 2D structure are merged or connected at their ends (side view)

Metal grid;  scale = 200 μm

Carbon nano-fiber mat; fiber diameter = 150 nm

Graphene foam; 100 μm

Carbon foam

Graphite foam

Ni foam

Cu foam

Stainless steel foam

PRODUCTION PROCESS FOR ALKALI METAL-SULFUR BATTERIES HAVING HIGH VOLUMETRIC AND GRAVIMETRIC ENERGY DENSITIES

FIELD OF THE INVENTION

This invention is directed at a secondary (rechargeable) lithium-sulfur battery (including Li—S and Li ion-S cells) or sodium-sulfur battery (including Na—S and Na ion-S cells) having a high volumetric energy density and a high gravimetric energy density.

BACKGROUND

Rechargeable lithium-ion (Li-ion) and lithium metal batteries (including Li-sulfur and Li metal-air batteries) are considered promising power sources for electric vehicle (EV), hybrid electric vehicle (HEV), and portable electronic devices, such as lap-top computers and mobile phones. Lithium as a metal element has the highest capacity (3,861 mAh/g) compared to any other metal or metal-intercalated compound as an anode active material (except $Li_{4.4}Si$, which has a specific capacity of 4,200 mAh/g). Hence, in general, Li metal batteries have a significantly higher energy density than lithium ion batteries.

Historically, rechargeable lithium metal batteries were produced using non-lithiated compounds having relatively high specific capacities, such as $TiS_2$, $MoS_2$, $MnO_2$, $CoO_2$, and $V_2O_5$, as the cathode active materials, which were coupled with a lithium metal anode. When the battery was discharged, lithium ions were transferred from the lithium metal anode through the electrolyte to the cathode, and the cathode became lithiated. Unfortunately, upon repeated charges/discharges, the lithium metal resulted in the formation of dendrites at the anode that ultimately grew to penetrate through the separator, causing internal shorting and explosion. As a result of a series of accidents associated with this problem, the production of these types of secondary batteries was stopped in the early 1990's, giving ways to lithium-ion batteries.

In lithium-ion batteries, pure lithium metal sheet or film was replaced by carbonaceous materials as the anode. The carbonaceous material absorbs lithium (through intercalation of lithium ions or atoms between graphene planes, for instance) and desorbs lithium ions during the re-charge and discharge phases, respectively, of the lithium ion battery operation. The carbonaceous material may comprise primarily graphite that can be intercalated with lithium and the resulting graphite intercalation compound may be expressed as $Li_xC_6$, where x is typically less than 1.

Although lithium-ion (Li-ion) batteries are promising energy storage devices for electric drive vehicles, state-of-the-art Li-ion batteries have yet to meet the cost and performance targets. Li-ion cells typically use a lithium transition-metal oxide or phosphate as a positive electrode (cathode) that de/re-intercalates $Li^+$ at a high potential with respect to the carbon negative electrode (anode). The specific capacity of lithium transition-metal oxide or phosphate based cathode active material is typically in the range of 140-170 mAh/g. As a result, the specific energy of commercially available Li-ion cells is typically in the range of 120-250 Wh/kg, most typically 150-220 Wh/kg. These specific energy values are two to three times lower than what would be required for battery-powered electric vehicles to be widely accepted.

With the rapid development of hybrid (REV), plug-in hybrid electric vehicles (HEV), and all-battery electric vehicles (EV), there is an urgent need for anode and cathode materials that provide a rechargeable battery with a significantly higher specific energy, higher energy density, higher rate capability, long cycle life, and safety. One of the most promising energy storage devices is the lithium-sulfur (Li—S) cell since the theoretical capacity of Li is 3,861 mAh/g and that of S is 1,675 mAh/g. In its simplest form, a Li—S cell consists of elemental sulfur as the positive electrode and lithium as the negative electrode. The lithium-sulfur cell operates with a redox couple, described by the reaction $S_8 + 16Li \leftrightarrow 8Li_2S$ that lies near 2.2 V with respect to $Li^+/Li°$. This electrochemical potential is approximately ⅔ of that exhibited by conventional positive electrodes (e.g. $LiMnO_4$) in a conventional lithium-ion battery. However, this shortcoming is offset by the very high theoretical capacities of both Li and S. Thus, compared with conventional intercalation-based Li-ion batteries, Li—S cells have the opportunity to provide a significantly higher energy density (a product of capacity and voltage). Assuming complete reaction to $Li_2S$, energy densities values can approach 2,500 Wh/kg and 2,800 Wh/L, respectively, based on the combined Li and S weight or volume. If based on the total cell weight or volume, the energy densities can reach approximately 1,000 Wh/kg and 1,100 Wh/L, respectively. However, the current Li-sulfur cells reported by industry leaders in sulfur cathode technology have a maximum cell specific energy of 250-400 Wh/kg and 500-650 Wh/L (based on the total cell weight or volume), which are far below what is possible.

In summary, despite its considerable advantages, the Li—S cell is plagued with several major technical problems that have thus far hindered its widespread commercialization:

(1) Conventional lithium metal cells still have dendrite formation and related internal shorting issues.
(2) Sulfur or sulfur-containing organic compounds are highly insulating, both electrically and ionically. To enable a reversible electrochemical reaction at high current densities or charge/discharge rates, the sulfur must maintain intimate contact with an electrically conductive additive. Various carbon-sulfur composites have been utilized for this purpose, but only with limited success owing to the limited scale of the contact area. Typical reported capacities are between 300 and 550 mAh/g (based on the cathode carbon-sulfur composite weight) at moderate rates.
(3) The cell tends to exhibit significant capacity decay during discharge-charge cycling. This is mainly due to the high solubility of the lithium polysulfide anions formed as reaction intermediates during both discharge and charge processes in the polar organic solvents used in electrolytes. During cycling, the lithium polysulfide anions can migrate through the separator to the Li negative electrode whereupon they are reduced to solid precipitates ($Li_2S_2$ and/or $Li_2S$), causing active mass loss. In addition, the solid product that precipitates on the surface of the positive electrode during discharge becomes electrochemically irreversible, which also contributes to active mass loss.
(4) More generally speaking, a significant drawback with cells containing cathodes comprising elemental sulfur, organosulfur and carbon-sulfur materials relates to the dissolution and excessive out-diffusion of soluble sulfides, polysulfides, organo-sulfides, carbon-sulfides and/or carbon-polysulfides (hereinafter referred to as anionic reduction products) from the cathode into the rest of the cell. This phenomenon is commonly referred to as the Shuttle Effect. This process leads to several problems: high self-discharge rates, loss of cathode capacity, corrosion of current collectors and electrical leads leading to loss of electrical contact to active cell components, fouling of the anode surface giving rise to malfunction of the anode, and clogging of the pores in the cell membrane separator which leads to loss of ion transport and large increases in internal resistance in the cell.

In response to these challenges, new electrolytes, protective films for the lithium anode, and solid electrolytes have been developed. Some interesting cathode developments have been reported recently to contain lithium polysulfides; but, their performance still fall short of what is required for practical applications.

For instance, Ji, et al reported that cathodes based on nanostructured sulfur/meso-porous carbon materials could overcome these challenges to a large degree, and exhibit stable, high, reversible capacities with good rate properties and cycling efficiency [Xiulei Ji, Kyu Tae Lee, & Linda F. Nazar, "A highly ordered nanostructured carbon-sulphur cathode for lithium-sulphur batteries," *Nature Materials* 8, 500-506 (2009)]. However, the fabrication of the proposed highly ordered meso-porous carbon structure requires a tedious and expensive template-assisted process. It is also challenging to load a large proportion of sulfur into these meso-scaled pores using a physical vapor deposition or solution precipitation process.

Zhang, et al. (US Pub. No. 2014/0234702; Aug. 21, 2014) makes use of a chemical reaction method of depositing S particles on surfaces of isolated graphene oxide (GO) sheets. But, this method is incapable of creating a large proportion of S particles on GO surfaces (i.e. typically <66% of S in the GO-S nanocomposite composition). The resulting Li—S cells also exhibit poor rate capability; e.g. the specific capacity of 1,100 mAh/g (based on S weight) at 0.02 C rate is reduced to <450 mAh/g at 1.0 C rate. It may be noted that the highest achievable specific capacity of 1,100 mAh/g represents a sulfur utilization efficiency of only 1,100/1,675=65.7% even at such a low charge/discharge rate (0.02 C means completing the charge or discharge process in 1/0.02=50 hours; 1 C=1 hour, 2 C=½ hours, and 3 C=⅓ hours, etc.) Further, such a S-GO nanocomposite cathode-based Li—S cell exhibits very poor cycle life, with the capacity typically dropping to less than 60% of its original capacity in less than 40 charge/discharge cycles. Such a short cycle life makes this Li—S cell not useful for any practical application. Another chemical reaction method of depositing S particles on graphene oxide surfaces is disclosed by Wang, et al. (US Pub. No. 2013/0171339; Jul. 4, 2013). This Li—S cell still suffers from the same problems.

A solution precipitation method was disclosed by Liu, et al. (US Pub. No. 2012/0088154; Apr. 12, 2012) to prepare graphene-sulfur nanocomposites (having sulfur particles adsorbed on GO surfaces) for use as the cathode material in a Li—S cell. The method entails mixing GO sheets and S in a solvent ($CS_2$) to form a suspension. The solvent is then evaporated to yield a solid nanocomposite, which is then ground to yield nanocomposite powder having primary sulfur particles with an average diameter less than approximately 50 nm. Unfortunately, this method does not appear to be capable of producing S particles less than 40 nm. The resulting Li—S cell exhibits very poor cycle life (a 50% decay in capacity after only 50 cycles). Even when these nanocomposite particles are encapsulated in a polymer, the Li—S cell retains less than 80% of its original capacity after 100 cycles. The cell also exhibits a poor rate capability (specific capacity of 1,050 mAh/g (S wt.) at 0.1 C rate, dropped to <580 mAh/g at 1.0 C rate). Again, this implies that a large proportion of S did not contribute to the lithium storage, resulting in a low S utilization efficiency.

Despite the various approaches proposed for the fabrication of high energy density Li—S cells, there remains a need for cathode materials and production processes that improve the utilization of electro-active cathode materials (S utilization efficiency), and provide rechargeable Li—S cells with high capacities over a large number of cycles.

Most significantly, lithium metal (including pure lithium, lithium alloys of high lithium content with other metal elements, or lithium-containing compounds with a high lithium content; e.g. >80% or preferably >90% by weight Li) still provides the highest anode specific capacity as compared to essentially all other anode active materials (except pure silicon, but silicon has pulverization issues). Lithium metal would be an ideal anode material in a lithium-sulfur secondary battery if dendrite related issues could be addressed.

Sodium metal (Na) and potassium metal (K) have similar chemical characteristics to Li and the sulfur cathode in room temperature sodium-sulfur cells (RT Na—S batteries) or potassium-sulfur cells (K—S) face the same issues observed in Li—S batteries, such as: (i) low active material utilization rate, (ii) poor cycle life, and (iii) low Coulombic efficiency. Again, these drawbacks arise mainly from insulating nature of S, dissolution of S and Na or K polysulfide intermediates in liquid electrolytes (and related Shuttle effect), and large volume change during charge/discharge.

It may be noted that in most of the open literature reports (scientific papers) and patent documents, scientists or inventors choose to express the cathode specific capacity based on the sulfur or lithium polysulfide weight alone (not the total cathode composite weight), but unfortunately a large proportion of non-active materials (those not capable of storing lithium, such as conductive additive and binder) is typically used in their Li—S cells. For practical use purposes, it is more meaningful to use the cathode composite weight-based capacity value.

Low-capacity anode or cathode active materials are not the only problem associated with the lithium-sulfur or sodium-sulfur battery. There are serious design and manufacturing issues that the battery industry does not seem to be aware of, or has largely ignored. For instance, despite the seemingly high gravimetric capacities at the electrode level (based on the anode or cathode active material weight alone) as frequently claimed in open literature and patent documents, these electrodes unfortunately fail to provide batteries with high capacities at the battery cell or pack level (based on the total battery cell weight or pack weight). This is due to the notion that, in these reports, the actual active material mass loadings of the electrodes are too low. In most cases, the active material mass loadings of the anode (areal density) is significantly lower than 15 $mg/cm^2$ and mostly <8 $mg/cm^2$ (areal density=the amount of active materials per electrode cross-sectional area along the electrode thickness direction). The cathode active material amount is typically 1.5-2.5 times higher than the anode active material amount in a cell. As a result, the weight proportion of the anode active material (e.g. carbon) in a Na ion-sulfur or Li ion-sulfur battery cell is typically from 15% to 20%, and that of the cathode active material from 20% to 35% (mostly <30%). The weight fraction of the cathode and anode active materials combined is typically from 35% to 50% of the cell weight.

The low active material mass loading is primarily due to the inability to obtain thicker electrodes (thicker than 100-200 μm) using the conventional slurry coating procedure. This is not a trivial task as one might think, and in reality the electrode thickness is not a design parameter that can be arbitrarily and freely varied for the purpose of optimizing the cell performance. Contrarily, thicker samples tend to become extremely brittle or of poor structural integrity and would also require the use of large amounts of binder resin. Due to the low-melting and soft characteristics of sulfur, it has been practically impossible to produce a sulfur cathode thicker than 100 μm. Furthermore, in a real battery manufacturing facility, a coated electrode thicker than 150 μm would require a heating zone as long as 100 meters to thoroughly dry the coated slurry. This would significantly increase the equipment cost and reduce the production throughput. The low areal densities and low volume densities (related to thin electrodes and poor packing density) result in a relatively low volumetric capacity and low volumetric energy density of the battery cells.

With the growing demand for more compact and portable energy storage systems, there is keen interest to increase the utilization of the volume of the batteries. Novel electrode materials and designs that enable high volumetric capacities and high mass loadings are essential to achieving improved cell volumetric capacities and energy densities.

Thus, an object of the present invention is to provide a rechargeable alkali metal-sulfur cell based on rational materials and battery designs that overcome or significantly reduce the following issues commonly associated with conventional Li—S and Na—S cells: (a) dendrite formation (internal shorting); (b) extremely low electric and ionic conductivities of sulfur, requiring large proportion (typically 30-55%) of non-active conductive fillers and having significant proportion of non-accessible or non-reachable sulfur or alkali metal polysulfides); (c) dissolution of S and alkali metal polysulfide in electrolyte and migration of polysulfides from the cathode to the anode (which irreversibly react with Li or Na metal at the anode), resulting in active material loss and capacity decay (the shuttle effect); (d) short cycle life; and (e) low active mass loading in both the anode and the cathode.

A specific object of the present invention is to provide a rechargeable alkali metal-sulfur battery (e.g. mainly Li—S and room temperature Na—S battery) that exhibits an exceptionally high specific energy or high energy density. One particular technical goal of the present invention is to provide an alkali metal-sulfur or alkali ion-sulfur cell with a cell specific energy greater than 400 Wh/Kg, preferably greater than 500 Wh/Kg, more preferably greater than 600 Wh/Kg, and most preferably greater than 700 Wh/kg (all based on the total cell weight). Preferably, the volumetric energy density is greater than 600 Wh/L, further preferably greater than 800 Wh/L, and most preferably greater than 1,000 Wh/L.

Another object of the present invention is to provide an alkali metal-sulfur cell that exhibits a high cathode specific capacity, higher than 1,200 mAh/g based on the sulfur weight, or higher than 1,000 mAh/g based on the cathode composite weight (including sulfur, conducting additive or substrate, and binder weights combined, but excluding the weight of cathode current collector). The specific capacity is preferably higher than 1,400 mAh/g based on the sulfur weight alone or higher than 1,200 mAh/g based on the cathode composite weight. This must be accompanied by a high specific energy, good resistance to dendrite formation, and a long and stable cycle life.

SUMMARY OF THE INVENTION

The present invention provides an alkali metal-sulfur battery that has a high cathode active material mass loading, a thick cathode, a high sulfur cathode specific capacity, an exceptionally low overhead weight and volume (relative to the active material mass and volume), a high gravimetric energy density, and a high volumetric energy density that have never been previously achieved. The invention includes both the lithium metal-sulfur and room temperature sodium metal-sulfur cells.

The lithium-sulfur batteries include (a) the lithium metal-sulfur (Li—S cell) that uses a Li metal or Li metal alloy (e.g. Li foil) as the main anode active material and sulfur, polysulfide, and/or sulfur-carbon compound as the main cathode active material and (b) the lithium ion-sulfur cell that makes use of a lithium intercalation compound (e.g. graphite and Si) as the main anode active material and sulfur, polysulfide, and/or sulfur-carbon compound as the main cathode active material. The sodium-sulfur batteries include (a) the sodium metal-sulfur (Na—S cell) that uses a Na metal or Na metal alloy (e.g. Na foil) as the main anode active material and sulfur, polysulfide, and/or sulfur-carbon compound as the main cathode active material and (b) the sodium ion-sulfur cell that makes use of a sodium intercalation compound (e.g. hard carbon particles and Sn) as the main anode active material and sulfur, polysulfide, and/or sulfur-carbon compound as the main cathode active material.

In one embodiment, the presently invented battery comprises:
(a) an anode having (i) an anode active material slurry (or suspension) comprising an anode active material and an optional conductive additive dispersed in a first electrolyte and (ii) a conductive porous structure acting as a 3D anode current collector wherein the conductive porous structure has at least 70% by volume of pores and wherein the anode active material slurry is disposed in pores of the anode conductive porous structure (the terms "anode conductive porous structure" and "3D anode current collector" are herein used interchangeably);
(b) a cathode having (i) a cathode active material slurry comprising a cathode active material and an optional conductive additive dispersed in a second electrolyte (preferably a liquid or gel electrolyte), the same as or different than the first liquid or gel electrolyte, and (ii) a conductive porous structure acting as a 3D cathode current collector wherein the conductive porous structure has at least 70% by volume of pores and wherein the cathode active material slurry is disposed in pores of the cathode conductive porous structure (the terms "cathode conductive porous structure" and "3D cathode current collector" are herein used interchangeably);
The cathode active material is selected from sulfur bonded to pore walls of the cathode current collector, sulfur bonded to or confined by a carbon or graphite material, sulfur bonded to or confined by a polymer, sulfur-carbon compound, metal sulfide $M_xS_y$, wherein x is an integer from 1 to 3 and y is an integer from 1 to 10, and M is a metal element selected from Li, Na, K, Mg, Ca, a transition metal, a metal from groups 13 to 17 of the periodic table, or a combination thereof; and (c) a separator disposed between the anode and the cathode.

In this battery, the anode thickness-to-anode current collector thickness ratio is from 0.8/1 to 1/0.8 and/or the cathode thickness-to-cathode current collector thickness ratio is from 0.8/1 to 1/0.8. The 3D porous anode current collector or cathode current collector has a thickness no less than 200 μm, the cathode active material constitutes an electrode active material loading greater than 10 mg/cm² (preferably >15 mg/cm², further preferably >20 mg/cm², and most preferably >30 mg/cm²) and/or the anode active material and the cathode active material combined exceeds 40% by weight of the total battery cell weight.

This alkali metal-sulfur battery may be produced by a process (as an example), comprising: (a) Preparing a first conductive porous structure or first conductive foam layer; (b) Preparing a second conductive porous structure or second conductive foam layer; (c) Injecting or impregnating a first suspension into pores of the first conductive porous structure to form an anode electrode, wherein the first suspension contains an anode active material, an optional conductive additive, and a first liquid or gel electrolyte and wherein the anode electrode and the first conductive porous structure are similar or comparable in shape and dimensions; (d) Injecting or impregnating a second suspension into pores of the second conductive porous structure to form a cathode electrode, wherein the second suspension contains a cathode active material, an optional conductive additive, and a second liquid or gel electrolyte, wherein the cathode active material is selected from sulfur, lithium polysulfide, sodium polysulfide, sulfur-polymer composite, organo-sulfide, sulfur-carbon composite, sulfur-graphene composite, or a combination thereof; and wherein the cathode electrode and the second conductive porous structure are similar or comparable in shape and dimensions; and (e) Assembling the anode electrode, a separator, and a cathode electrode into said alkali metal-sulfur battery.

In some embodiments, step (a), (b), (c), (d), and (e) are conducted in the following sequence:
(A) Preparing the first suspension and the second suspension;
(B) Assembling a porous cell framework composed of the first conductive porous structure as a porous anode current collector, the second conductive porous structure as a porous cathode current collector, and a porous separator disposed between the porous anode current collector and the porous cathode current collector; wherein the porous anode current collector and/or the porous cathode current collector has a thickness no less than 200 μm and at least 70% by volume of pores; and
(C) Injecting the first suspension into pores of the anode current collector to form the anode electrode and injecting the second suspension into pores of the cathode current collector to form the cathode electrode to an extent that the anode active material has a material mass loading no less than 20 mg/cm² in the anode electrode or the cathode active material has a material mass loading no less than 10 mg/cm² (preferably >15 mg/cm², further preferably >20 mg/cm², and most preferably >30 mg/cm²) in the cathode electrode;

wherein the anode current collector, the separator, and the cathode current collector are assembled in a protective housing before or after the injection or impregnation of first suspension and/or the injection or impregnation of second suspension.

In a preferred embodiment, the process comprises:
A) Assembling a porous cell framework composed of a first conductive porous structure (e.g. a conductive foam or an interconnected 3D network of electron-conducting paths) as a 3D anode current collector, a second conductive porous structure (e.g. a conductive foam) as a 3D cathode current collector, and a porous separator disposed between the first and second conductive porous structure; wherein the first and/or second conductive foam structure has a thickness no less than 200 μm (preferably greater than 300 μm, more preferably greater than 400 μm, further preferably greater than 500 μm, and most preferably greater than 600 μm) and at least 70% by volume of pores (preferably at least 80% porosity, more preferably at least 90%, and most preferably at least 95%; these pore volumes referring to amounts of pores prior to being impregnated with an electrode active material slurry or suspension);
B) Preparing a first suspension of an anode active material and an optional conductive additive dispersed in a first liquid or gel electrolyte and a second suspension of a cathode active material and an optional conductive additive dispersed in a second liquid or gel electrolyte; and
C) Impregnating the pores of the first conductive porous structure with the first suspension (e.g. injecting the first suspension into pores of the first conductive porous structure) to form an anode and impregnating the pores of the second conductive porous structure with the second suspension (e.g. injecting the second suspension into pores of the second conductive foam structure) to form a cathode to the extent that preferably the anode active material has a material mass loading no less than 20 mg/cm² in the anode or the cathode active material has a material mass loading no less than 10 mg/cm² (preferably >15 mg/cm², further preferably >20 mg/cm², and most preferably >30 mg/cm²) in the cathode.

The anode current collector, the separator, and the cathode current collector are assembled in a protective housing before, during or after the injecting (or impregnation) of the first suspension and/or the injecting (or impregnation) of the second suspension.

In certain embodiments, the above step (a), (b), (c), (d), and (e) are conducted in the following sequence:
(A) Preparing one or a plurality of electrically conductive porous layers, one or a plurality of wet anode layers of the first suspension, and one or a plurality of wet cathode layers of the second suspension, wherein the conductive porous layers contain interconnected conductive pathways and at least 70% by volume of pores;
(B) Stacking and consolidating a desired number of the porous layers and a desired number of the wet anode layers in a sequence to form said anode electrode having a thickness no less than 200 μm;
(C) Placing the porous separator layer in contact with the anode electrode;
(D) Stacking and consolidating a desired number of the porous layers and a desired number of the wet cathode layers in a sequence to form the cathode electrode in contact with the porous separator, wherein the cathode electrode has a thickness no less than 200 μm; and
(E) Assembling and sealing the anode electrode, porous separator, and cathode electrode in a housing to produce the alkali metal-sulfur battery;

wherein the anode active material has a material mass loading no less than 20 mg/cm$^2$ in the anode electrode and/or said cathode active material has a material mass loading no less than 15 mg/cm$^2$ in the cathode electrode.

Another embodiment of the present invention is an alkali metal-sulfur battery, comprising:
(a) an anode having an anode active material coated on or in physical contact with an anode current collector wherein the anode active material is in ionic contact with a first electrolyte;
(b) a cathode having (i) a cathode active material slurry or suspension comprising a cathode active material and an optional conductive additive dispersed in a second liquid or gel electrolyte, the same as or different than the first liquid or gel electrolyte, and (ii) a conductive porous structure acting as a 3D cathode current collector wherein the conductive porous structure has at least 70% by volume of pores (preferably at least 80% and more preferably at least 90%) and wherein the cathode active material slurry is disposed in pores of the cathode conductive porous structure, wherein the cathode active material is selected from sulfur, lithium polysulfide, sodium polysulfide, sulfur-polymer composite, organo-sulfides, sulfur-carbon composite, sulfur-graphene composite, or a combination thereof; and
(c) a separator disposed between said anode and said cathode;
wherein the cathode thickness-to-cathode current collector thickness ratio is from 0.8/1 to 1/0.8, and/or the cathode active material constitutes an electrode active material loading greater than 15 mg/cm$^2$, and the 3D cathode current collector has a thickness no less than 200 μm (preferably greater than 300 μm, more preferably greater than 400 μm, further preferably greater than 500 μm, and most preferably greater than 600 μm). There is no theoretical limit on the thickness of the conductive porous structure. A thicker porous structure (or porous current collector) implies a greater amount of electrode active materials. Given the same separator layer and approximately the same packaging envelop and other non-active components, this thicker electrode also implies a relatively higher proportion of active materials and, hence, higher energy density.

In an alkali metal-sulfur battery (e.g. wherein the anode active material is a Li foil or Na foil), the anode current collector may contain a porous foamed structure. In an alkali metal-sulfur battery, the first electrolyte can be a gel electrolyte or solid-state electrolyte.

In certain embodiments, the cathode active material is supported by a functional material or nano-structured material selected from the group consisting of: (a) A nano-structured or porous disordered carbon material selected from particles of a soft carbon, hard carbon, polymeric carbon or carbonized resin, meso-phase carbon, coke, carbonized pitch, carbon black, activated carbon, nano-cellular carbon foam or partially graphitized carbon; (b) A nano graphene platelet selected from a single-layer graphene sheet or multi-layer graphene platelet; (c) A carbon nanotube selected from a single-walled carbon nanotube or multi-walled carbon nanotube; (d) A carbon nano-fiber, nano-wire, metal oxide nano-wire or fiber, conductive polymer nano-fiber, or a combination thereof; (e) A carbonyl-containing organic or polymeric molecule; (f) A functional material containing a carbonyl, carboxylic, or amine group to reversibly capture sulfur; and combinations thereof.

In certain embodiments, the anode active material contains an alkali ion source selected from an alkali metal, an alkali metal alloy, a mixture of alkali metal or alkali metal alloy with an alkali intercalation compound, an alkali element-containing compound, or a combination thereof.

In some embodiments (e.g. Li ion-sulfur or sodium ion-sulfur cell), the anode active material contains an alkali intercalation compound selected from petroleum coke, carbon black, amorphous carbon, activated carbon, hard carbon, soft carbon, templated carbon, hollow carbon nanowires, hollow carbon sphere, natural graphite, artificial graphite, lithium or sodium titanate, $NaTi_2(PO_4)_3$, $Na_2Ti_3O_7$, $Na_2C_8H_4O_4$, $Na_2TP$, $Na_xTiO_2$ (x=0.2 to 1.0), $Na_2C_8H_4O_4$, carboxylate based materials, $C_8H_4Na_2O_4$, $C_8H_6O_4$, $C_8H_5NaO_4$, $C_8Na_2F_4O_4$, $C_{10}H_2Na_4O_8$, $C_{14}H_4O_6$, $C_{14}H_4Na_4O_8$, or a combination thereof.

In some embodiments, the anode active material contains an alkali intercalation compound or alkali-containing compound selected from the following groups of materials: (A) Lithium- or sodium-doped silicon (Si), germanium (Ge), tin (Sn), lead (Pb), antimony (Sb), bismuth (Bi), zinc (Zn), aluminum (Al), titanium (Ti), cobalt (Co), nickel (Ni), manganese (Mn), cadmium (Cd), and mixtures thereof; (B) Lithium- or sodium-containing alloys or intermetallic compounds of Si, Ge, Sn, Pb, Sb, Bi, Zn, Al, Ti, Co, Ni, Mn, Cd, and their mixtures; (C) Lithium- or sodium-containing oxides, carbides, nitrides, sulfides, phosphides, selenides, tellurides, or antimonides of Si, Ge, Sn, Pb, Sb, Bi, Zn, Al, Fe, Ti, Co, Ni, Mn, Cd, and mixtures or composites thereof; (D) Lithium or sodium salts; and (E) Graphene sheets pre-loaded with lithium or sodium.

The graphene sheets pre-loaded with lithium or sodium may be selected from pre-sodiated or pre-lithiated versions of pristine graphene, graphene oxide, reduced graphene oxide, graphene fluoride, graphene chloride, graphene bromide, graphene iodide, hydrogenated graphene, nitrogenated graphene, boron-doped graphene, nitrogen-doped graphene, chemically functionalized graphene, a physically or chemically activated or etched version thereof, or a combination thereof.

The first or second electrolyte may be selected from aqueous electrolyte, an organic electrolyte, ionic liquid electrolyte, mixture of an organic electrolyte and an ionic electrolyte, or a mixture thereof with a polymer. In an embodiment, the aqueous electrolyte contains a sodium salt or a potassium salt dissolved in water or a mixture of water and alcohol. The sodium salt or lithium salt may be selected from $Na_2SO_4$, $Li_2SO_4$, NaOH, LiOH, NaCl, LiCl, NaF, LiF, NaBr, LiBr, NaI, LiI, or a mixture thereof.

The alkali metal-sulfur battery may contain an organic electrolyte having a liquid organic solvent selected from the group consisting of 1,3-dioxolane (DOL), 1,2-dimethoxy-ethane (DME), tetraethylene glycol dimethylether (TEGDME), poly(ethylene glycol) dimethyl ether (PEGDME), diethylene glycol dibutyl ether (DEGDBE), 2-ethoxyethyl ether (EEE), sulfone, sulfolane, ethylene carbonate (EC), dimethyl carbonate (DMC), methylethyl carbonate (MEC), diethyl carbonate (DEC), ethyl propionate, methyl propionate, propylene carbonate (PC), gamma.-butyrolactone (γ-BL), acetonitrile (AN), ethyl acetate (EA), propyl formate (PF), methyl formate (MF), toluene, xylene, methyl acetate (MA), fluoroethylene carbonate (FEC), vinylene carbonate (VC), allyl ethyl carbonate (AEC), a hydrofloroether, and combinations thereof.

The electrolyte in the alkali metal-sulfur battery may contain an alkali metal salt selected from lithium perchlorate ($LiClO_4$), lithium hexafluorophosphate ($LiPF_6$), lithium borofluoride (LiBF$_4$), lithium hexafluoroarsenide (LiAsF$_6$), lithium trifluoro-metasulfonate (LiCF$_3$SO$_3$), bis-trifluoromethyl sulfonylimide lithium (LiN(CF$_3$SO$_2$)$_2$, Lithium bis (oxalato)borate (LiBOB), lithium oxalyldifluoroborate (LiBF$_2$C$_2$O$_4$), lithium oxalyldifluoroborate (LiBF$_2$C$_2$O$_4$), Lithium nitrate (LiNO$_3$), Li-Fluoroalkyl-Phosphates (LiPF3 (CF$_2$CF$_3$)$_3$), lithium bisperfluoro-ethysulfonylimide (LiBETI), sodium perchlorate (NaClO$_4$), potassium perchlorate (KClO$_4$), sodium hexafluorophosphate (NaPF$_6$), potassium hexafluorophosphate (KPF$_6$), sodium borofluoride (NaBF$_4$), potassium borofluoride (KBF$_4$), sodium hexafluoroarsenide, potassium hexafluoroarsenide, sodium trifluoro-metasulfonate (NaCF$_3$SO$_3$), potassium trifluoro-metasulfonate (KCF$_3$SO$_3$), bis-trifluoromethyl sulfonylimide sodium (NaN(CF$_3$SO$_2$)$_2$), sodium trifluoromethanesulfonimide (NaTFSI), bis-trifluoromethyl sulfonylimide potassium (KN(CF$_3$SO$_2$)$_2$), or a combination thereof.

The alkali metal-sulfur battery may contain an ionic liquid electrolyte containing an ionic liquid solvent selected from a room temperature ionic liquid having a cation selected from tetraalkylammonium, di-, tri-, or tetra-alkylimidazolium, alkylpyridinium, dialkyl-pyrrolidinium, dialkylpiperidinium, tetraalkylphosphonium, trialkylsulfonium, or a combination thereof. The ionic liquid solvent may be selected from a room temperature ionic liquid having an anion selected from BF$_4^-$, B(CN)$_4^-$, CH$_3$BF$_3^-$, CH$_2$CHBF$_3^-$, CF$_3$BF$_3^-$, C$_2$F$_5$BF$_3^-$, n-C$_3$F$_7$BF$_3^-$, n-C$_4$F$_9$BF$_3^-$, PF$_6^-$, CF$_3$CO$_2^-$, CF$_3$SO$_3^-$, N(SO$_2$CF$_3$)$_2^-$, N(COCF$_3$)(SO$_2$CF$_3$)$^-$, N(SO$_2$F)$_2$, N(CN)$_2^-$, C(CN)$_3^-$, SCN$^-$, SeCN$^-$, CuCl$_2^-$, AlCl$_4^-$, F(HF)$_{2.3}^-$, or a combination thereof.

The conductive porous structure can be a foam structure comprising an interconnected 2D or 3D network of electron-conducting paths. This can be, for instance, end-connected 2D mats, webs, chicken wire-like metal screens, etc., as illustrated in FIG. 2. This can also be metal foam, conductive polymer foam, graphite foam, carbon foam, or graphene foam, etc., wherein pore walls contain conductive materials.

In a preferred embodiment, as illustrated in FIG. 1(C) or 1(D), the 3D porous anode current collector extends all the way to an edge of the porous separator layer and in physical contact therewith. The 3D porous conductive cathode current collector may also extend all the way to the opposite edge of the porous separator and in physical contact therewith. In other words, the pore walls of the anode current collector cover the entire anode layer, and/or the pore walls of the cathode current collector cover the entire cathode layer. In these configurations, the ratio of current collector thickness/active material layer thickness is approximately 1/1 and the electrode thickness is essentially identical to the current collector thickness (the cathode thickness-to-cathode current collector thickness ratio is approximately 1 and the anode thickness-to-anode current collector thickness ratio is approximately 1). In these situations, conductive pore walls are in the immediate vicinity of every anode active material particle or every cathode active material particle.

In certain embodiments, the ratio of current collector thickness/active material layer thickness can be from approximately 0.8/1.0 to 1.0/0.8. Expressed in an alternative manner, the cathode thickness-to-cathode current collector thickness ratio is from 0.8/1 to 1/0.8 or the anode thickness-to-anode current collector thickness ratio is from 0.8/1 to 1/0.8. It may be noted that in a conventional lithium-ion or sodium-ion battery (as schematically illustrated in FIGS. 1(A) and 1(B)), the anode (or cathode) current collector is typically a Cu foil (or Al foil) that is 8-12 μm thick. The anode active material layer coated on the Cu foil surface is typically 80-100 μm. As such, the ratio of anode current collector thickness/anode active material layer thickness is typically 8/100-12/80. The ratio of current collector thickness to active material layer thickness at the cathode side of a conventional Li-ion or Na-ion cell is also approximately 1/12.5-1/6.7. In contrast, in the invented batteries, the ratio is from 0.8/1 to 1/0.8, more desirably 0.9/1 to 1/0.9, further more desirably 0.95/1 to 1/0.95, and most desirably and typically 1/1.

The pore volume (e.g. >70%) of a foamed current collector is a critically important requirement to ensure a large proportion of active materials accommodated in the current collector. Based on this criterion, conventional paper or textiles made of natural and/or synthetic fibers do not meet this requirement since they do not have a sufficient amount of properly sized pores.

The pore sizes in the first and/or second conductive porous structure are preferably in the range from 10 nm to 100 μm, more preferably from 100 nm to 50 μm, further preferably from 500 nm to 20 μm, and even more preferably from 1 μm to 10 μm, and most preferably from 1 μm to 5 μm. These pore size ranges are designed to accommodate anode active materials (such as carbon particles) and cathode active materials (such as sulfur/graphene composite particles), having a primary or secondary particle size typically from 10 nm to 20 μm in diameter, and most typically from 50 nm to 10 μm, further typically from 100 nm to 5 μm, and most typically from 200 nm to 3 μm.

More significantly, however, since all active material particles in a pore (e.g. with pore size of 5 μm) are, on average, within a distance of 2.5 μm from a pore wall in the 3D foam structure, electrons can be readily collected from the anode active material particle and Na or Li ions do not have to undergo a long-distance solid-state diffusion. This is in contrast to the notion that some electrons in the conventional thick electrode of prior art lithium-ion or sodium-ion battery (e.g. wherein graphite particle layer 100 μm in thickness is coated onto a surface of a solid Cu foil current collector 10 μm thick) must travel at least 50 μm to get collected by a current collector (meaning a larger internal resistance and reduced ability to deliver a higher power).

In general, the first liquid electrolyte and the second liquid electrolyte are identical in a battery, but they can be different in composition. The liquid electrolytes can be an aqueous liquid, organic liquid, ionic liquid (ionic salt having a melting temperature lower than 100° C., preferably lower than room temperature, 25° C.), or a mixture of an ionic liquid and an organic liquid at a ratio from 1/100 to 100/1. The organic liquid is desirable, but the ionic liquid is preferred. A gel electrolyte can also be used provided the electrolyte has some flowability to enable injection. Some small amount 0.1% to 10% can be incorporated into the liquid electrolyte.

In certain embodiments, the 3D porous anode current collector or 3D porous cathode current collector contains a conductive foam structure having a thickness no less than 200 μm, having at least 85% by volume of pores, and/or the anode active material has a mass loading no less than 20 mg/cm$^2$, occupies at least 25% by weight or by volume of the entire battery cell, and/or the cathode active material has a mass loading no less than 20 mg/cm$^2$.

In some preferred embodiments, the 3D porous anode current collector or 3D porous cathode current collector contains a conductive foam structure having a thickness no less than 300 μm, at least 90% by volume of pores, and/or the anode active material has a mass loading no less than 25 mg/cm$^2$, occupies at least 30% by weight or by volume of the entire battery cell, and/or the cathode active material has a mass loading no less than 25 mg/cm².

In some further preferred embodiments, the 3D porous anode current collector or 3D porous cathode current collector contains a conductive foam structure having a thickness no less than 400 μm, having at least 95% by volume of pores, and/or the anode active material has a mass loading no less than 30 mg/cm², occupies at least 35% by weight or by volume of the entire battery cell, and/or the cathode active material has a mass loading no less than 30 mg/cm².

The 3D porous anode current collector or 3D porous cathode current collector may contain a conductive foam structure selected from metal foam, metal web or screen, perforated metal sheet-based 3-D structure, metal fiber mat, metal nanowire mat, conductive polymer nano-fiber mat, conductive polymer foam, conductive polymer-coated fiber foam, carbon foam, graphite foam, carbon aerogel, carbon xerogel, graphene foam, graphene oxide foam, reduced graphene oxide foam, carbon fiber foam, graphite fiber foam, exfoliated graphite foam, or a combination thereof.

DETAILED DESCRIPTION OF PREFERRED EMBODIMENTS

This invention is directed at an alkali metal-sulfur battery (Li—S or room temperature Na—S) exhibiting an exceptionally high volumetric energy density that has never been previously achieved for the same type of battery. This does not include the so-called high-temperature Na—S cell that must operate at a temperature higher than the melting point of the electrolyte (typically >350° C.) and higher than the melting point of sulfur. This alkali metal battery can be a primary battery, but is preferably a secondary battery selected from an alkali metal-ion battery (e.g. using a Li or Na intercalation compound, such as hard carbon particles) or an alkali metal secondary battery (e.g. using Na or Li metal foil as an anode active material). The battery is based on an aqueous electrolyte, an organic electrolyte, a gel electrolyte, an ionic liquid electrolyte, or a mixture of organic and ionic liquid. The shape of an alkali metal battery can be cylindrical, square, button-like, etc. The present invention is not limited to any battery shape or configuration.

Figure 1A:
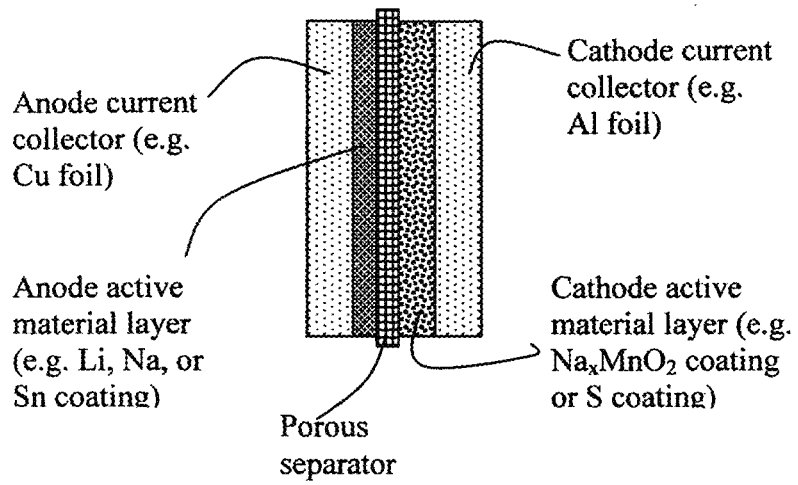
FIG. 1(A) Schematic of a prior art Li—S or Na—S battery cell composed of an anode current collector, an anode electrode (e.g. Li foil or thin Sn coating layer), a porous separator, a cathode electrode, and a cathode current collector.
Figure 1B:
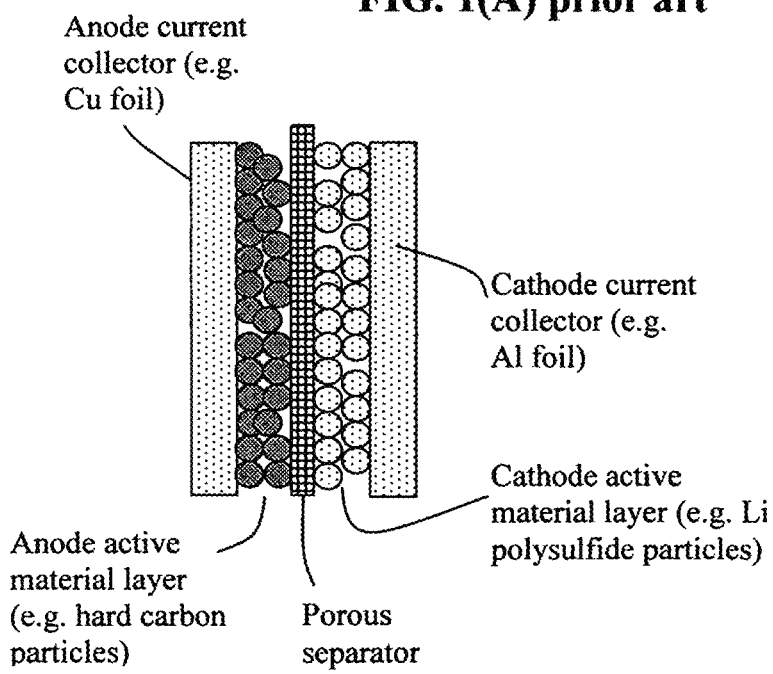
FIG. 1(B) Schematic of a prior art sodium-ion battery, wherein the electrode layer is composed of discrete particles of an active material (e.g. hard carbon particles in the anode layer or polysulfide particles in the cathode layer).

As illustrated in FIGS. 1(A) and 1(B), a conventional lithium-ion, sodium-ion, Li—S, or Na—S battery cell is typically composed of an anode current collector (e.g. Cu foil), an anode electrode (anode active material layer), a porous separator and/or an electrolyte component, a cathode electrode (cathode active material layer), and a cathode current collector (e.g. Al foil). In a more commonly used cell configuration (FIG. 1(B)), the anode layer is composed of particles of an anode active material (e.g. hard carbon particles), a conductive additive (e.g. expanded graphite flakes), and a resin binder (e.g. SBR or PVDF). The cathode layer is composed of particles of a cathode active material (e.g. NaFePO$_4$ particles in a Na-ion cell or S-carbon composite particles in a Li—S cell), a conductive additive (e.g. carbon black particles), and a resin binder (e.g. PVDF). Both the anode and the cathode layers are typically 60-100 μm thick (typically significantly thinner than 200 μm) to give rise to a presumably sufficient amount of current per unit electrode area. Using an active material layer thickness of 100 μm and the solid (Cu or Al foil) current collector layer thickness of 10 μm as examples, the resulting battery configuration has a current collector thickness-to-active material layer thickness ratio of 10/100 or 1/10 for conventional battery cells.

This thickness range of 60-100 μm is considered an industry-accepted constraint under which a battery designer normally works under, based on the current slurry coating process (roll coating of active material-binder-additive mixture slurry). This thickness constraint is due to several reasons: (a) the existing battery electrode coating machines are not equipped to coat excessively thin or excessively thick electrode layers; (b) a thinner layer is preferred based on the consideration of reduced lithium ion diffusion path lengths; but, too thin a layer (e.g. <60 μm) does not contain a sufficient amount of an active alkali metal ion storage material (hence, insufficient current output); (c) thicker electrodes are prone to delaminate or crack upon drying or handling after roll-coating of slurry; and (d) thicker coating requires an excessively long heating zone (it is not unusual to have a heating zone longer than 100 meters, making the manufacturing equipment very expensive). This constraint has made it impossible to freely increase the amount of active materials (those responsible for storing Na or Li ions) without increasing the amounts of all non-active materials (e.g. current collectors and separator) in order to obtain a minimum overhead weight and a maximum sodium storage capability and, hence, a maximized energy density (Wk/kg or Wh/L of cell).

In a less commonly used cell configuration, as illustrated in FIG. 1(A), either the anode active material (e.g. NaTi$_2$(PO$_4$)$_3$ or Na film) or the cathode active material (e.g. lithium transition metal oxide in a Li-ion cell or sulfur/carbon mixture in a Li—S cell) is deposited in a thin film form directly onto a current collector, such as a sheet of copper foil or Al foil using sputtering. However, such a thin film structure with an extremely small thickness-direction dimension (typically much smaller than 500 nm, often necessarily thinner than 100 nm) implies that only a small amount of active material can be incorporated in an electrode (given the same electrode or current collector surface area), providing a low total Na or Li storage capacity per unit electrode surface area. Such a thin film must have a thickness less than 100 nm to be more resistant to cycling-induced cracking (for the anode) or to facilitate a full utilization of the cathode active material. Such a constraint further diminishes the total Na or Li storage capacity and the sodium or lithium storage capacity per unit electrode surface area. Such a thin-film battery has very limited scope of application.

On the anode side, a sputtered NaTi$_2$(PO$_4$)$_3$ layer thicker than 100 nm has been found to exhibit poor cracking resistance during battery charge/discharge cycles. It takes but a few cycles to get fragmented. On the cathode side, a layer of sulfur thicker than 100 nm does not allow lithium or sodium ions to fully penetrate and reach full body of the cathode layer, resulting in a poor cathode active material utilization rate. A desirable electrode thickness is at least 100 μm (not 100 nm), with individual active material particle having a dimension desirably less than 100 nm. Thus, these thin-film electrodes (with a thickness <100 nm) directly deposited on a current collector fall short of the required thickness by three (3) orders of magnitude. As a further problem, all of the cathode active materials are not very conductive to both electrons and sodium/lithium ions. A large layer thickness implies an excessively high internal resistance and a poor active material utilization rate.

In other words, there are several conflicting factors that must be considered concurrently when it comes to the design and selection of a cathode or anode active material in terms of material type, size, electrode layer thickness, and active material mass loading. Thus far, there has been no effective solution offered by any prior art teaching to these often conflicting problems. We have solved these challenging issues, which have troubled battery designers and electro-chemists alike for more than 30 years, by developing a new process of producing alkali metal-sulfur batteries as herein disclosed.

The prior art sodium or lithium battery cell is typically made by a process that includes the following steps: (a) The first step is mixing particles of the anode active material (e.g. hard carbon particles), a conductive filler (e.g. expanded graphite flakes), a resin binder (e.g. PVDF) in a solvent (e.g. NMP) to form an anode slurry. On a separate basis, particles of the cathode active material (e.g. sodium metal phosphate particles for the Na-ion cell and LFP particles for the Li-ion cell), a conductive filler (e.g. acetylene black), a resin binder (e.g. PVDF) are mixed and dispersed in a solvent (e.g. NMP) to form a cathode slurry. (b) The second step includes coating the anode slurry onto one or both primary surfaces of an anode current collector (e.g. Cu foil), drying the coated layer by vaporizing the solvent (e.g. NMP) to form a dried anode electrode coated on Cu foil. Similarly, the cathode slurry is coated and dried to form a dried cathode electrode coated on Al foil. Slurry coating is normally done in a roll-to-roll manner in a real manufacturing situation; (c) The third step includes laminating an anode/Cu foil sheet, a porous separator layer, and a cathode/Al foil sheet together to form a 3-layer or 5-layer assembly, which is cut and slit into desired sizes and stacked to form a rectangular structure (as an example of shape) or rolled into a cylindrical cell structure. (d) The rectangular or cylindrical laminated structure is then encased in an aluminum-plastic laminated envelope or steel casing. (e) A liquid electrolyte is then injected into the laminated structure to make a sodium-ion or lithium battery cell.

There are several serious problems associated with the process and the resulting sodium-ion cells and lithium-ion battery cells (or Li—S and Na—S cells):

1) It is very difficult to produce an electrode layer (anode layer or cathode layer) that is thicker than 100 μm, let alone 200 μm. There are several reasons why this is the case. An electrode of 100 μm thickness typically requires a heating zone of 30-100 meters long in a slurry coating facility, which is too time consuming, too energy intensive, and not cost-effective. For some electrode active materials, such as metal oxide particles or sulfur, it has not been possible to produce an electrode of good structural integrity that is thicker than 100 μm in a real manufacturing environment on a continuous basis. The resulting electrodes are very fragile and brittle. Thicker electrodes have a high tendency to delaminate and crack.

2) With a conventional process, as depicted in FIG. 1(A), the actual mass loadings of the electrodes and the apparent densities for the active materials are too low to achieve a high energy density. In most cases, the anode active material mass loading of the electrodes (areal density) is significantly lower than 15 mg/cm$^2$ and the apparent volume density or tap density of the active material is typically less than 1.2 g/cm$^3$ even for relatively large particles of graphite. The cathode active material mass loading of the electrodes (areal density) is significantly lower than 10 mg/cm$^2$ for the sulfur cathode. In addition, there are so many other non-active materials (e.g. conductive additive and resin binder) that add additional weights and volumes to the electrode without contributing to the cell capacity. These low areal densities and low volume densities result in a relatively low gravimetric energy density and low volumetric energy density.

3) The conventional process requires dispersing electrode active materials (anode active material and cathode active material) in a liquid solvent (e.g. NMP) to make a slurry and, upon coating on a current collector surface, the liquid solvent has to be removed to dry the electrode layer. Once the anode and cathode layers, along with a separator layer, are laminated together and packaged in a housing to make a supercapacitor cell, one then injects a liquid electrolyte (using a salt dissolved in a solvent different than NMP) into the cell. In actuality, one makes the two electrodes wet, then makes the electrodes dry, and finally makes them wet again. Such a wet-dry-wet process is not a good process at all. Furthermore, the most commonly used solvent (NMP) is a notoriously undesirable solvent (known to cause birth defect, for instance).

4) Current Li—S and Na—S batteries still suffer from a relatively low gravimetric energy density and low volumetric energy density. Hence, neither the Li—S nor room temperature Na—S battery has made it to the market place.

In literature, the energy density data reported based on either the active material weight alone or the electrode weight cannot directly translate into the energy densities of a practical battery cell or device. The "overhead weight" or weights of other device components (binder, conductive additive, current collectors, separator, electrolyte, and packaging) must also be taken into account. The convention production process results in the weight proportion of the anode active material (e.g. carbon particles) in a sodium-ion battery being typically from 15% to 20%, and that of the cathode active material (e.g. sodium transition metal oxide) from 20% to 30%.

Figure 1C:
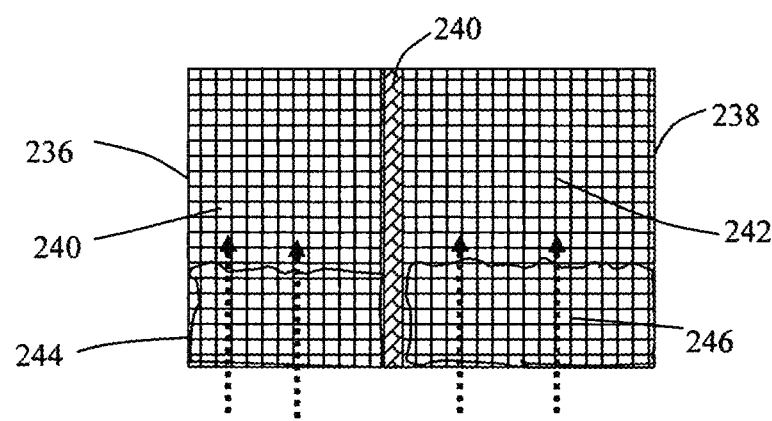
FIG. 1(C) Schematic of a presently invented lithium-sulfur or sodium-sulfur battery cell, comprising an anode current collector in the form of a highly porous foam, a porous separator, and a cathode current collector in the form of a highly porous foam. Suspensions are being injected or impregnated into pores of the two current collectors. Half of the pores have been filled, for illustration purpose.
Figure 1D:
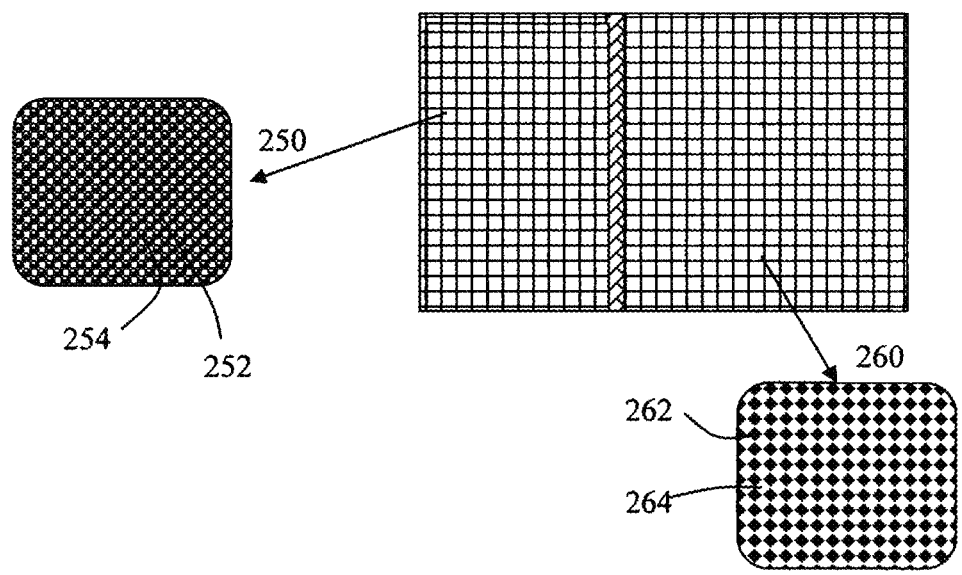
FIG. 1(D) Schematic of a presently invented Na ion-sulfur or Li ion-sulfur battery cell, comprising an anode current collector in the form of a highly conductive porous foam, a porous separator, and a cathode current collector in the form of a highly porous foam. The pores of the two foamed current collectors have been impregnated with their respective suspensions.

The present invention provides a process for producing a Li—S or Na—S battery cell having a high electrode thickness (thickness of the electrode that contains electrode active materials, not including the thickness of any active material-free current collector layer, if existing), high active material mass loading, low overhead weight and volume, high volumetric capacitance, and high volumetric energy density. In one embodiment, as illustrated in FIGS. 1(C) and 1(D), the invented process comprises:

(A) Assembling a porous cell framework composed of a first conductive porous or foam structure 236 as an anode current collector, a second conductive porous or foam structure as a cathode current collector 238, and a porous separator 240 disposed between the first and second conductive porous structure;

a. The first and/or second conductive porous structure has a thickness no less than 100 μm (preferably greater than 200 μm, more preferably greater than 300 μm, further preferably greater than 400 μm, and most preferably greater than 500 μm) and at least 70% by volume of pores (preferably at least 80% porosity, more preferably at least 90%, and most preferably at least 95%);

b. These conductive porous structures have essentially a porosity level of 70%-99% and remaining 1%-30% being pore walls (e.g. metal or graphite skeleton). These pores are used to accommodate a mixture of active materials (e.g. carbon particles in the anode+ an optional conductive additive) and liquid electrolyte.

(B) Preparing a first suspension (or slurry) of an anode active material and an optional conductive additive dispersed in a first liquid electrolyte and a second suspension (slurry) of a cathode active material and an optional conductive additive dispersed in a second liquid electrolyte; and (C) Injecting or impregnating the first suspension into pores of the first conductive porous structure to form an anode and injecting or impregnating the second suspension into pores of the second conductive foam structure to form a cathode to an extent that the anode active material constitutes an electrode active material loading no less than 20 mg/cm$^2$ (preferably no less than 25 mg/cm$^2$ and more preferably no less than 30 mg/cm$^2$) in the anode, or the cathode active material constitutes an electrode active material mass loading no less than 10 mg/cm² (preferably greater than 15 mg/cm² and more preferably greater than 20 mg/cm²) for a sulfur-based cathode active material), wherein the anode, the separator, and the cathode are assembled in a protective housing.

a. Preferably, substantially all of the pores are filled with the electrode (anode or cathode) active material, optional conductive additive, and liquid electrolyte (no binder resin needed).

b. Since there are great amounts of pores (70-99%) relative to the pore walls (1-30%), very little space is wasted ("being wasted" means not being occupied by the electrode active material and electrolyte), resulting in high amounts of electrode active material-electrolyte zones (high active material loading mass).

c. Shown in FIG. 1(C) is a situation, wherein the conductive porous structure for the anode (3D anode current collector 236) has been partially filled with the first suspension (anode active material and optional conductive additive dispersed in the liquid electrolyte). The top portion 240 of the anode current collector foam 236 remains empty, but the lower portion 244 has been filled with the anode suspension. Similarly, the top portion 242 of the cathode current collector foam 238 remains empty and the lower portion 246 has been filled with the cathode suspension (cathode active material dispersed in the liquid electrolyte). The four arrows represent the suspension injection directions.

Shown in FIG. 1(D) is a situation, wherein both the anode current collector foam and the cathode current collector foam have been filled with their respective suspensions. As an example, a foam pore 250, in an enlarged view, is filled with the anode suspension containing hard carbon particles 252 (an anode active material) and liquid electrolyte 254. Similarly, a foam pore 260, in an enlarged view, is filled with the cathode suspension containing carbon-coated sulfur or polysulfide particles 262 (a cathode active material) and liquid electrolyte 264.

Figure 1E:
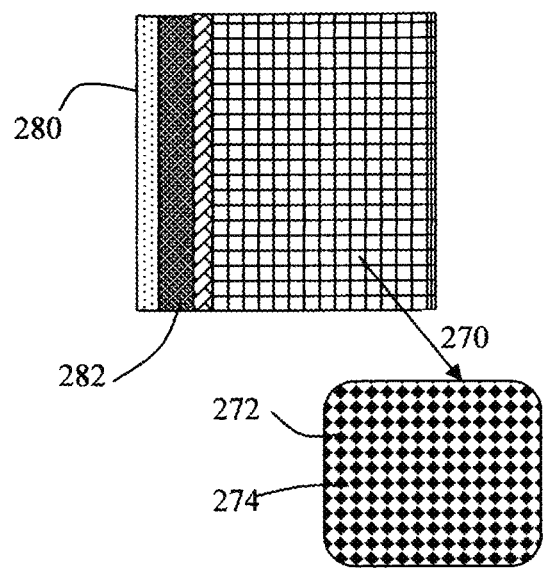
FIG. 1(E) Schematic of a presently invented Na metal-sulfur or Li metal-sulfur battery cell, comprising an anode current collector containing a layer of Na or Li metal or alloy deposited thereon, a porous separator, and a cathode current collector in the form of a highly porous foam. The pores of this foamed current collector have been impregnated with a cathode-electrolyte suspension.

An alternative configuration, as schematically illustrated in FIG. 1(E), is a presently invented sodium metal or lithium metal battery cell, comprising an anode current collector 280 containing a layer of Na or Li metal 282 or Na/Li metal alloy deposited thereon, a porous separator, and a cathode current collector in the form of a highly porous foam. The pores 270 of this foamed current collector have been impregnated with a suspension of cathode active material 272 and liquid electrolyte 274.

In such configurations (FIG. 1(C)-(E)), the electrons only have to travel a short distance (half of the pore size, on average; e.g. a few micrometers) before they are collected by the current collector (pore walls) since pore walls are present everywhere throughout the entire current collector (also the entire anode layer). Additionally, in each suspension, all electrode active material particles are pre-dispersed in a liquid electrolyte (no electrolyte wettability issue), eliminating the existence of dry pockets commonly present in an electrode prepared by the conventional process of wet coating, drying, packing, and electrolyte injection. Thus, the presently invented process leads to a totally unexpected advantage over the conventional battery cell production process.

Figure 1F:
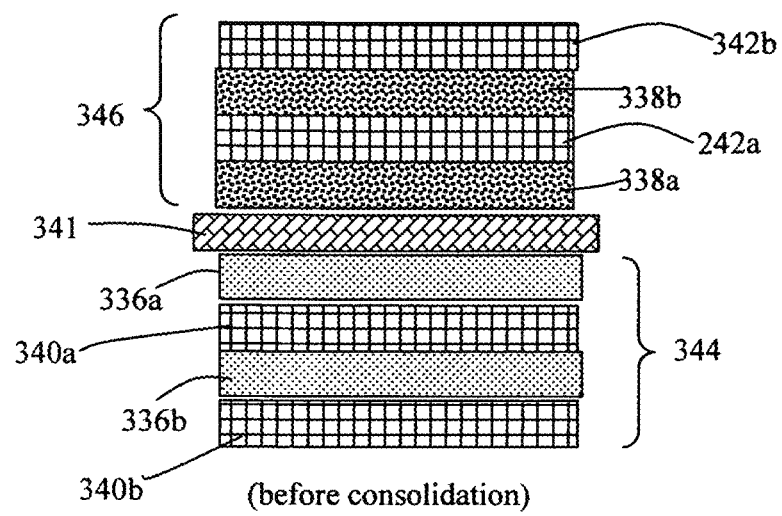
FIG. 1(F) Schematic of a presently invented alkali metal-sulfur battery cell, comprising (i) a stack of alternatingly configured conductive porous layers and wet anode layers, (ii) a porous separator, and (iii) a stack of alternatingly configured conductive porous layers and wet cathode layers prior to consolidation (e.g. via compression) of multiple porous layers (as a backbone of a current collector) and wet electrode layers together to achieve infiltration of porous layers by the anode active material and liquid electrolyte (and optional conductive additive) to form the anode electrode and prior to infiltration of porous layers by the cathode active material and liquid electrolyte (and optional conductive additive) to form the cathode electrode.
Figure 1G:
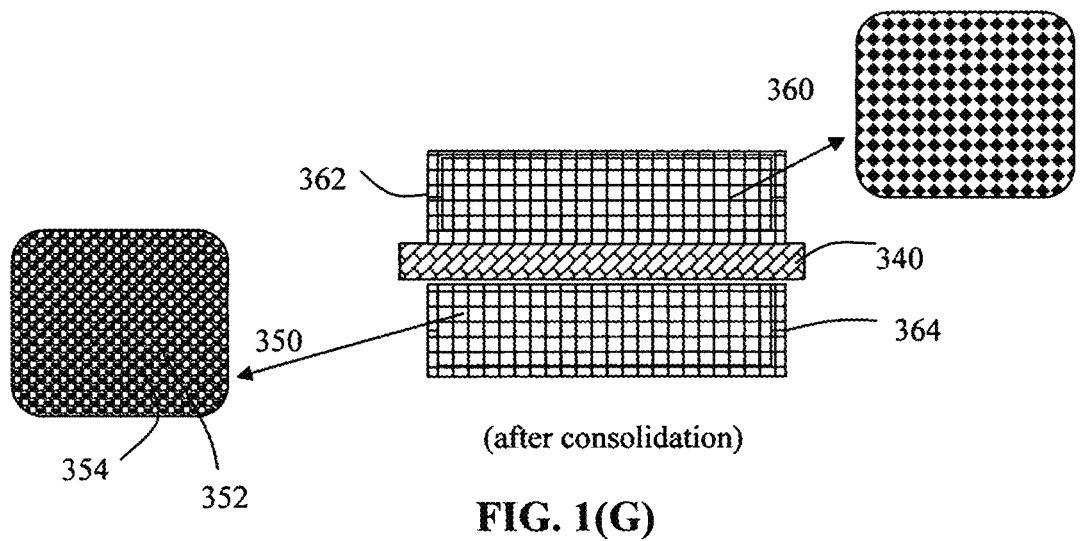
FIG. 1(G) Schematic of a presently invented alkali metal-sulfur battery cell, as illustrated in FIG. 1(F), but after consolidation (e.g. via compression) of multiple porous layers (as a backbone of a current collector) and wet electrode layers together to achieve infiltration of porous layers by the anode active material and liquid electrolyte (and optional conductive additive) to form the anode electrode and after infiltration of porous layers by the cathode active material and liquid electrolyte (and optional conductive additive) to form the cathode electrode FIG. 1(H) Schematic of a presently invented alkali metal-sulfur battery cell, comprising an anode current collector containing a layer of alkali metal (Na or Li or alkali metal alloy deposited thereon, a porous separator, and a stack of alternatingly placed conductive porous layers and cathode layers before (top portion) and after (lower portion) of consolidation and infiltration of cathode active material and liquid electrolyte into pores of the porous layers.

The present invention also provides another version of the process for producing a lithium-sulfur or sodium-sulfur battery cell having a high electrode thickness, high active material mass loading, low overhead weight and volume, high volumetric capacitance, and high volumetric energy density. In one embodiment, as illustrated in FIGS. 1(F) and 1(G), the invented process comprises:

(A) Preparing a plurality of electrically conductive porous layers (e.g. 340a, 340b at the anode side and 342a, 342b at the cathode side), a plurality of wet anode layers (e.g. 336a, 336b) of an anode active material and an optional conductive additive mixed with a first liquid electrolyte, and a plurality of wet cathode layers (e.g. 338a, 338b) of a cathode active material and an optional conductive additive mixed with a second liquid electrolyte, wherein the conductive porous layers contain interconnected conductive pathways and at least 70% by volume of pores (preferably >80%);

(B) Stacking and consolidating a desired number of porous layers and a desired number of wet anode layers in an alternating manner (e.g. 344, shown prior to consolidation) to form an anode electrode (e.g. 364 in FIG. 1(G), after consolidation) having a thickness no less than 100 μm (preferably >200 μm, further preferably >300 μm, more preferably >400 μm; further more preferably >500 μm, 600 μm, or even >1,000 μm; no theoretical limitation on this anode thickness). Consolidation may involve the application of a compressive stress to force the wet anode layer ingredients to infiltrate into the pores of the multiple conductive porous layers. These multiple conductive porous layers are also compressed together to form an anode current collector that essentially extends over the thickness of the entire anode electrode 364;

(C) Placing a porous separator layer (341 in FIG. 1(F) or 1(G)) in contact with the anode electrode;

(D) Stacking and consolidating a desired number of conductive porous layers and a desired number of wet cathode layers in an alternating manner (e.g. 346, shown prior to consolidation) to form a cathode electrode (e.g. 362 in FIG. 1(G), after consolidation) in contact with the porous separator 341, wherein the cathode electrode has a thickness no less than 100 μm; wherein step (D) is conducted before or after step (B); The cathode thickness is preferably >200 μm, further preferably >300 μm, more preferably >400 μm; further more preferably >500 μm, 600 μm, or even >1,000 μm; no theoretical limitation on this cathode thickness. Consolidation may involve the application of a compressive stress to force the wet cathode layer ingredients to infiltrate into the pores of the multiple conductive porous layers. These multiple conductive porous layers are also compressed together to form a cathode current collector that essentially extends over the entire thickness of the cathode electrode 362; and (E) Assembling and sealing the anode electrode, porous separator, and cathode electrode in a housing to produce the lithium battery;

In this battery, the anode active material has a material mass loading no less than 20 mg/cm² in the anode electrode and/or the cathode active material has a material mass loading no less than 15 mg/cm² in the cathode electrode.

It may be noted that, if we pick a small zone 350 in the anode 364, we will find anode active material particles 352 (plus optional conductive additive) dispersed in a liquid electrolyte. If we pick a small zone 360 in the cathode, we will find cathode material particles (plus optional conductive additive) dispersed in a liquid electrolyte.

Figure 1H:
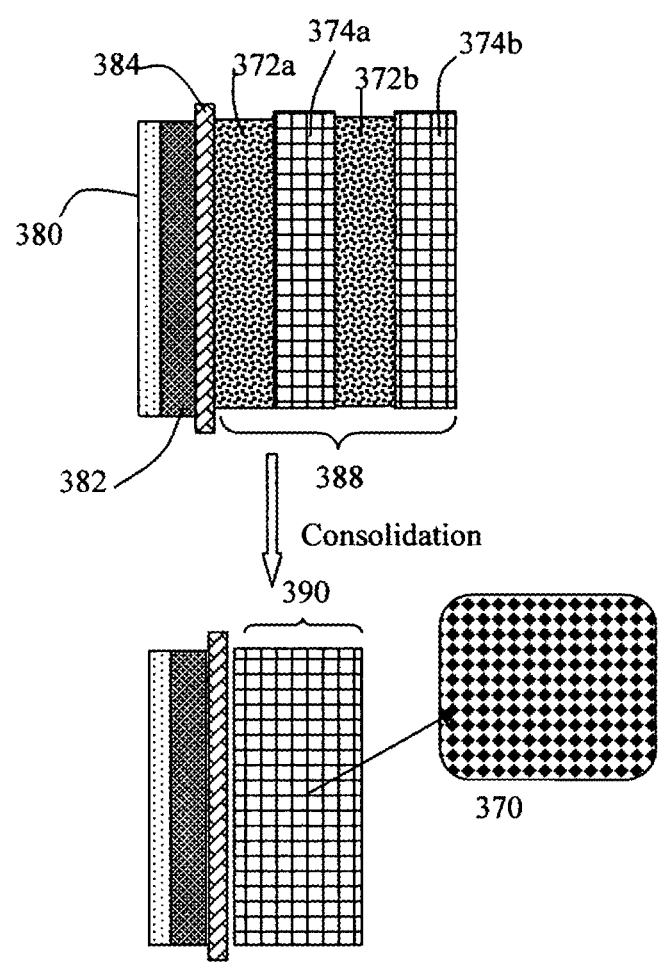
Figure 2:
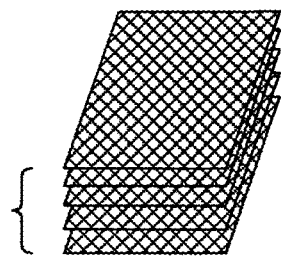
FIG. 2 Schematic of a foamed or porous current collector, as an example, composed of 5 sheets of highly porous 2D webs (e.g. chicken wire-shaped thin 2D structures) that are end-connected to form a tab (electrical terminal).
Figure 2:
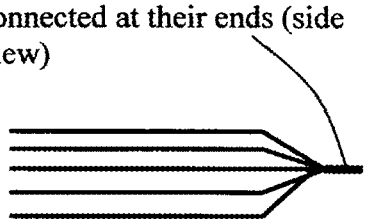
Figure 3A:
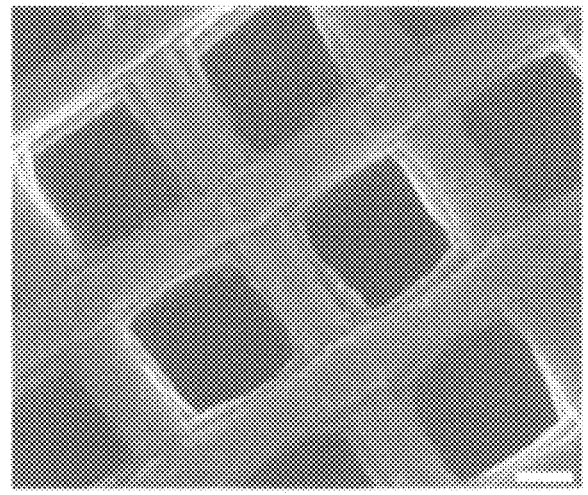
FIG. 3(A) Examples of conductive porous layers: metal grid/mesh and carbon nano-fiber mat.
Figure 3A:
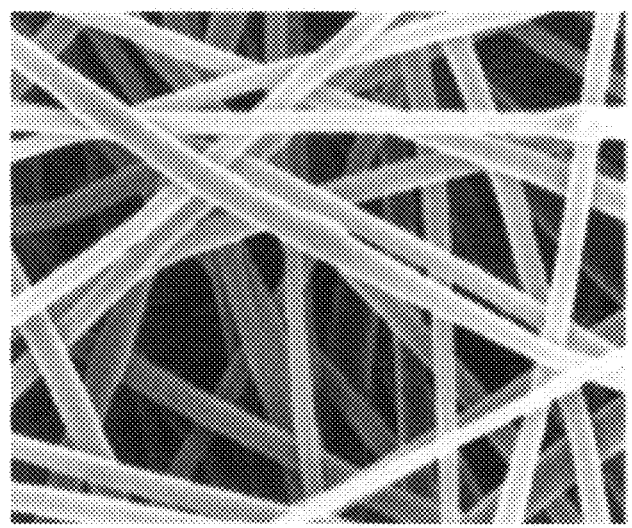
Figure 3B:
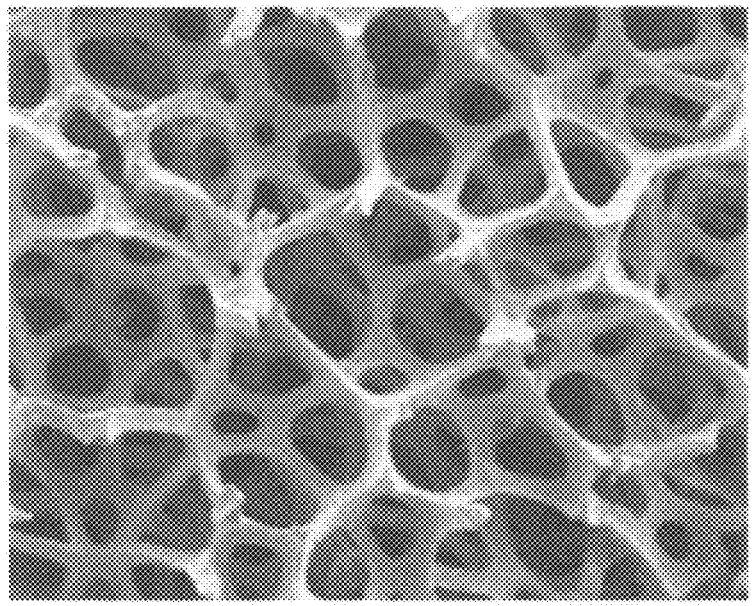
FIG. 3(B) Examples of conductive porous layers: graphene foam and carbon foam.
Figure 3B:
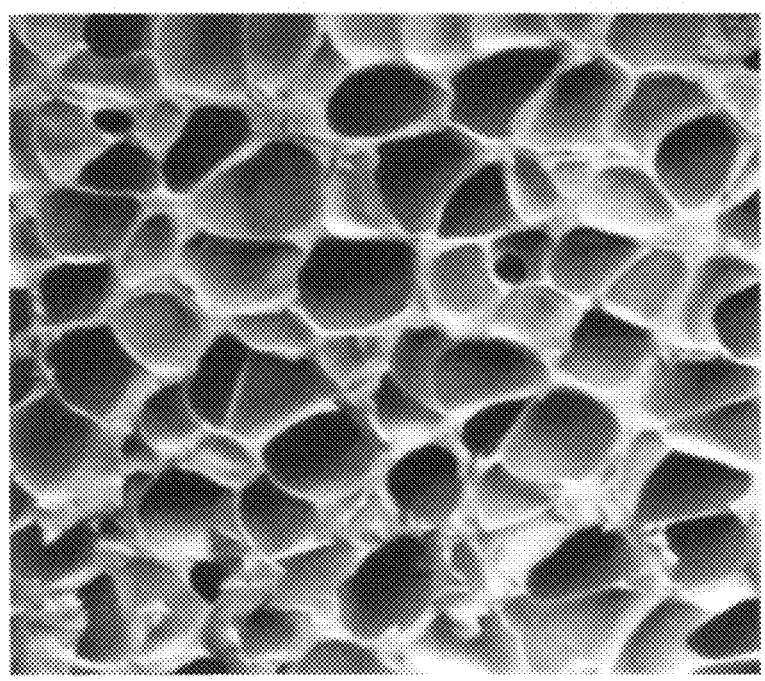
Figure 3C:
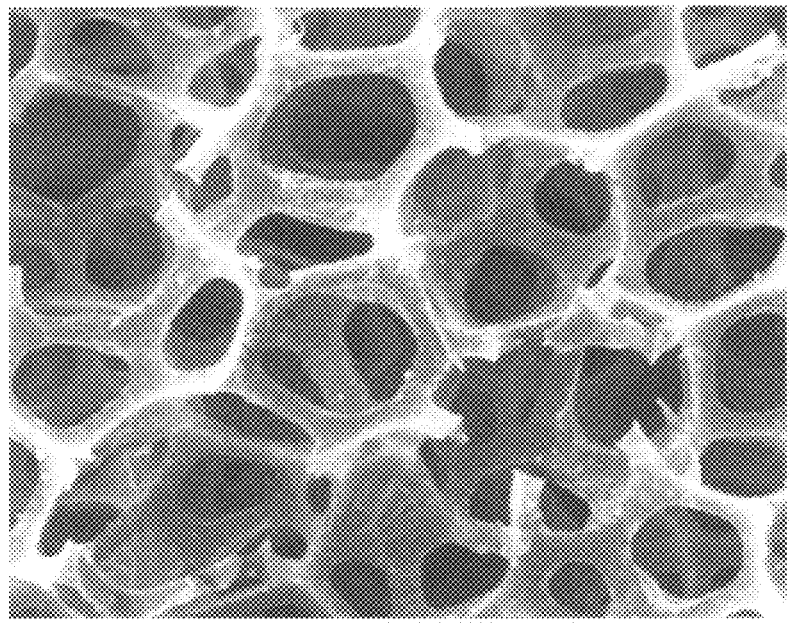
FIG. 3(C) Examples of conductive porous layers: graphite foam and Ni foam.
Figure 3C:
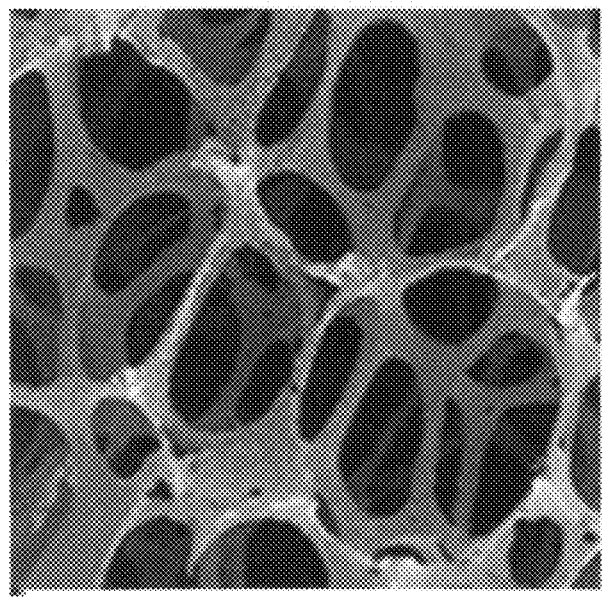
Figure 3D:
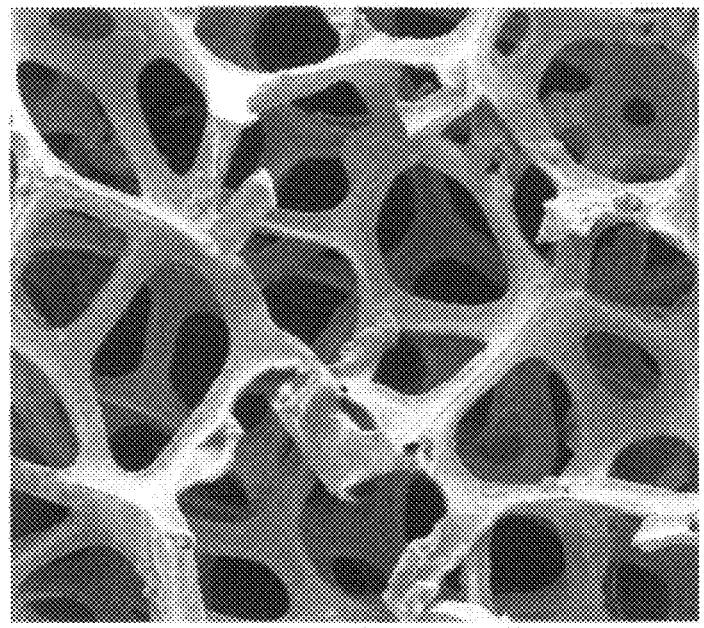
FIG. 3(D) Examples of conductive porous layers: Cu foam and stainless steel foam.
Figure 3D:
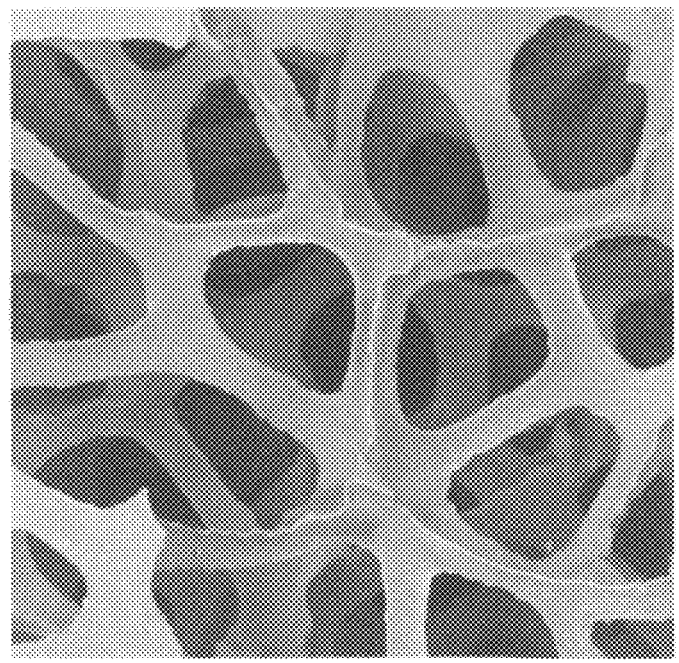

An alternative configuration, schematically illustrated in FIG. 1(H), is a presently invented lithium metal-sulfur or sodium metal-sulfur battery cell, comprising an anode current collector 280 containing a layer of lithium or sodium metal 382 or lithium metal alloy (or sodium metal alloy) deposited thereon, a porous separator 384, and a stack 388 of alternatingly arranged conductive porous layers (e.g. 374a, 374b), intended for use as part of a cathode current collector, and wet cathode layers (e.g. 372a, 372b) prior to being consolidated (compressed). Upon consolidation, the cathode active material and the liquid electrolyte (along with any optional conductive additive) are forced to permeate into pores of the conductive porous layers, which are also compressed to form a cathode layer 390. The pores 370 of this foamed current collector have been impregnated with a mixture of cathode active material particles and liquid electrolyte.

In a preferred embodiment, the anode active material is a pre-sodiated or pre-lithiated version of graphene sheets selected from pristine graphene, graphene oxide, reduced graphene oxide, graphene fluoride, graphene chloride, graphene bromide, graphene iodide, hydrogenated graphene, nitrogenated graphene, chemically functionalized graphene, or a combination thereof. The starting graphitic material for producing any one of the above graphene materials may be selected from natural graphite, artificial graphite, mesophase carbon, meso-phase pitch, meso-carbon micro-bead, soft carbon, hard carbon, coke, carbon fiber, carbon nanofiber, carbon nano-tube, or a combination thereof. Graphene materials are also a good conductive additive for both the anode and cathode active materials of an alkali metal battery.

The constituent graphene planes of a graphite crystallite in a natural or artificial graphite particle can be exfoliated and extracted or isolated to obtain individual graphene sheets of hexagonal carbon atoms, which are single-atom thick, provided the inter-planar van der Waals forces can be overcome. An isolated, individual graphene plane of carbon atoms is commonly referred to as single-layer graphene. A stack of multiple graphene planes bonded through van der Waals forces in the thickness direction with an inter-graphene plane spacing of approximately 0.3354 nm is commonly referred to as a multi-layer graphene. A multi-layer graphene platelet has up to 300 layers of graphene planes (<100 nm in thickness), but more typically up to 30 graphene planes (<10 nm in thickness), even more typically up to 20 graphene planes (<7 nm in thickness), and most typically up to 10 graphene planes (commonly referred to as few-layer graphene in scientific community). Single-layer graphene and multi-layer graphene sheets are collectively called "nano graphene platelets" (NGPs). Graphene sheets/platelets (collectively, NGPs) are a new class of carbon nano material (a 2-D nano carbon) that is distinct from the 0-D fullerene, the 1-D CNT or CNF, and the 3-D graphite. For the purpose of defining the claims and as is commonly understood in the art, a graphene material (isolated graphene sheets) is not (and does not include) a carbon nanotube (CNT) or a carbon nano-fiber (CNF).

Figure 4A:
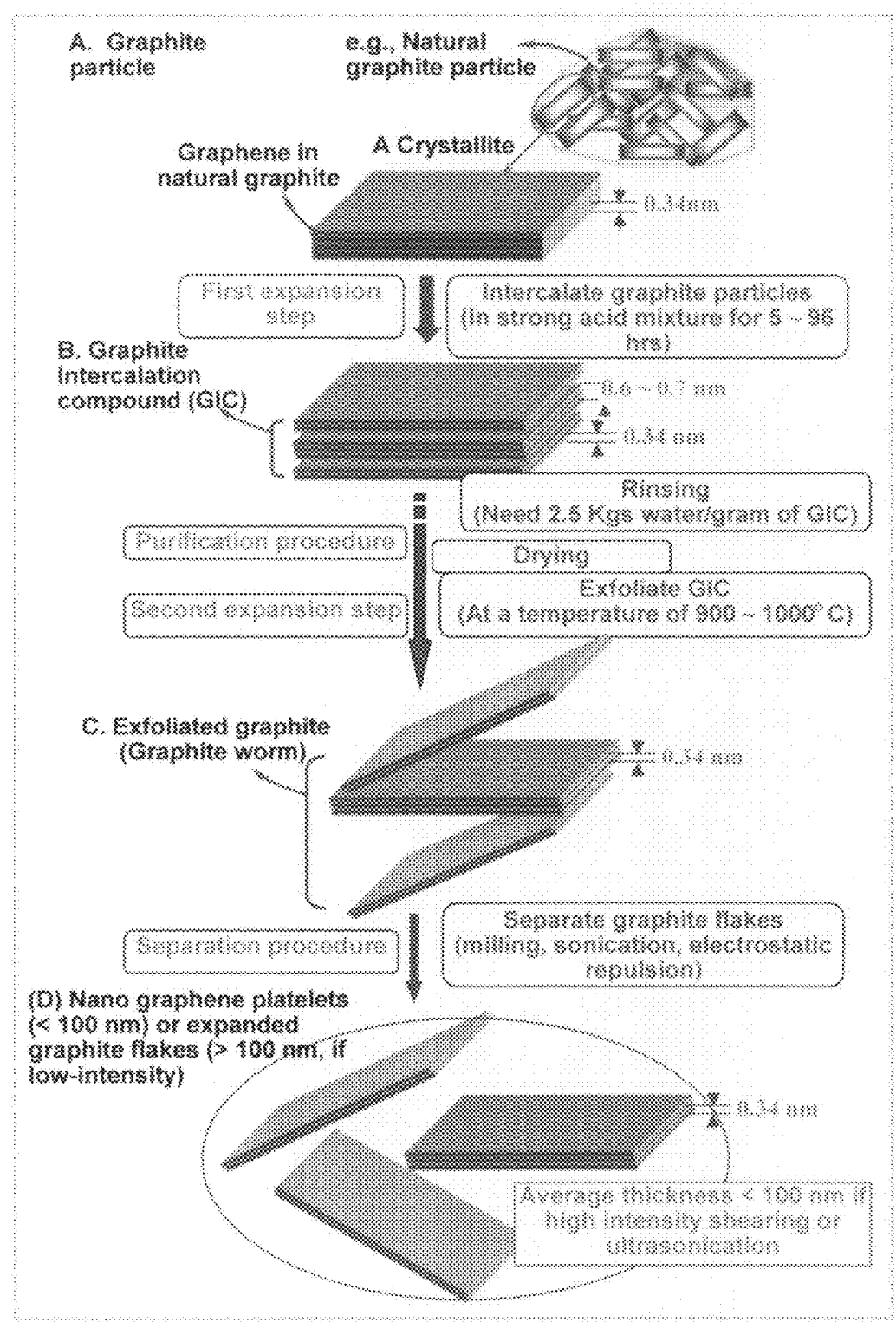
FIG. 4(A) Schematic of a commonly used process for producing exfoliated graphite, expanded graphite flakes (thickness >100 nm), and graphene sheets (thickness <100 nm, more typically <10 nm, and can be as thin as 0.34 nm).
Figure 4:
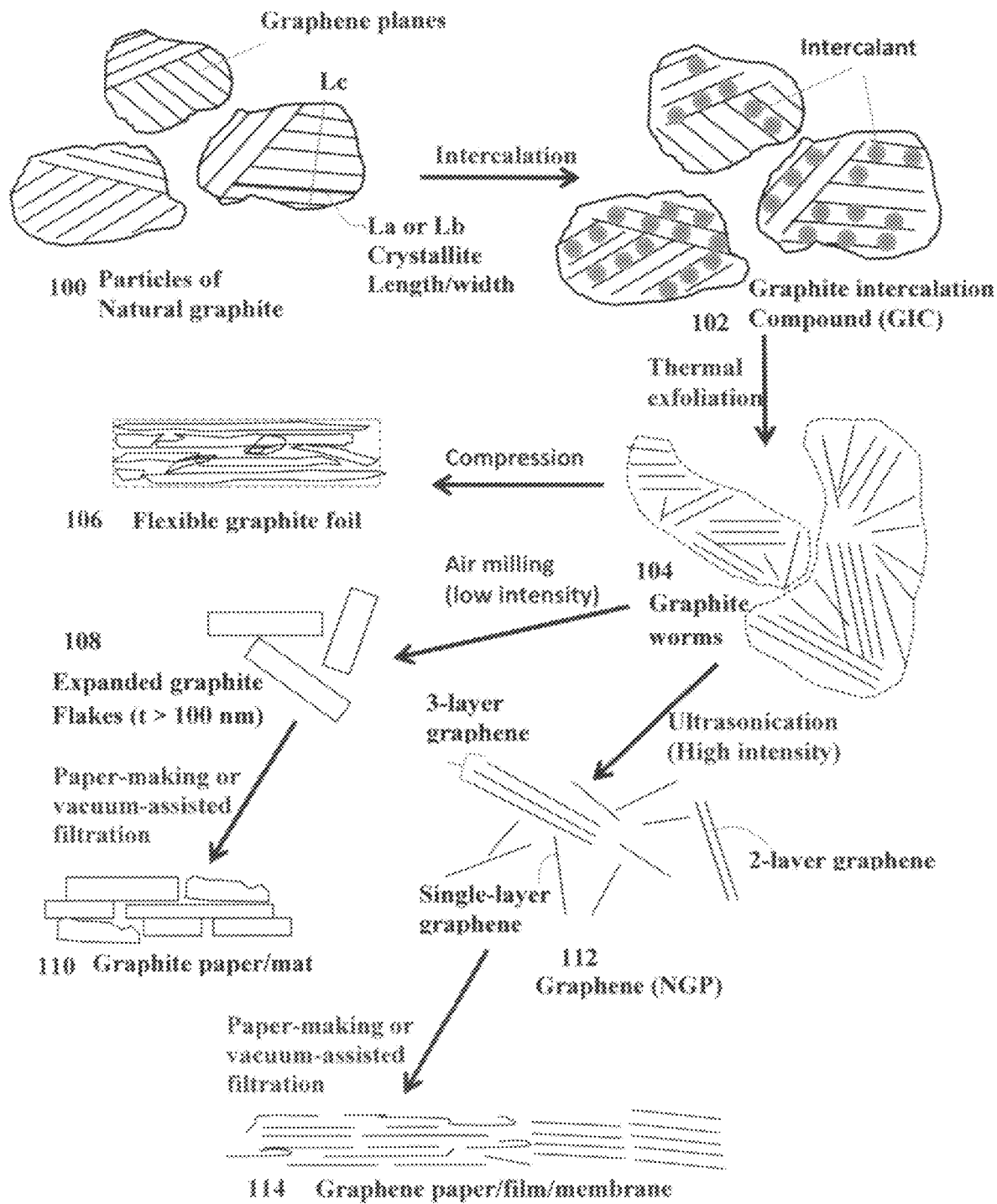
FIG. 4 (B) Schematic drawing to illustrate the processes for producing exfoliated graphite, expanded graphite flakes, and graphene sheets.

In one process, graphene materials are obtained by intercalating natural graphite particles with a strong acid and/or an oxidizing agent to obtain a graphite intercalation compound (GIC) or graphite oxide (GO), as illustrated in FIG. 4(A) and FIG. 4(B) (schematic drawings). The presence of chemical species or functional groups in the interstitial spaces between graphene planes in a GIC or GO serves to increase the inter-graphene spacing ($d_{002}$, as determined by X-ray diffraction), thereby significantly reducing the van der Waals forces that otherwise hold graphene planes together along the c-axis direction. The GIC or GO is most often produced by immersing natural graphite powder (100 in FIG. 4(B)) in a mixture of sulfuric acid, nitric acid (an oxidizing agent), and another oxidizing agent (e.g. potassium permanganate or sodium perchlorate). The resulting GIC (102) is actually some type of graphite oxide (GO) particles if an oxidizing agent is present during the intercalation procedure. This GIC or GO is then repeatedly washed and rinsed in water to remove excess acids, resulting in a graphite oxide suspension or dispersion, which contains discrete and visually discernible graphite oxide particles dispersed in water. In order to produce graphene materials, one can follow one of the two processing routes after this rinsing step, briefly described below:

Route 1 involves removing water from the suspension to obtain "expandable graphite," which is essentially a mass of dried GIC or dried graphite oxide particles. Upon exposure of expandable graphite to a temperature in the range of typically 800-1,050° C. for approximately 30 seconds to 2 minutes, the GIC undergoes a rapid volume expansion by a factor of 30-300 to form "graphite worms" (104), which are each a collection of exfoliated, but largely un-separated graphite flakes that remain interconnected.

In Route 1A, these graphite worms (exfoliated graphite or "networks of interconnected/non-separated graphite flakes") can be re-compressed to obtain flexible graphite sheets or foils (106) that typically have a thickness in the range of 0.1 mm (100 µm)-0.5 mm (500 µm). Alternatively, one may choose to use a low-intensity air mill or shearing machine to simply break up the graphite worms for the purpose of producing the so-called "expanded graphite flakes" (108) which contain mostly graphite flakes or platelets thicker than 100 nm (hence, not a nano material by definition).

In Route 1B, the exfoliated graphite is subjected to high-intensity mechanical shearing (e.g. using an ultrasonicator, high-shear mixer, high-intensity air jet mill, or high-energy ball mill) to form separated single-layer and multi-layer graphene sheets (collectively called NGPs, 112), as disclosed in our U.S. application Ser. No. 10/858,814 (Jun. 3, 2004). Single-layer graphene can be as thin as 0.34 nm, while multi-layer graphene can have a thickness up to 100 nm, but more typically less than 10 nm (commonly referred to as few-layer graphene). Multiple graphene sheets or platelets may be made into a sheet of NGP paper using a paper-making process. This sheet of NGP paper is an example of the porous graphene structure layer utilized in the presently invented process.

Route 2 entails ultrasonicating the graphite oxide suspension (e.g. graphite oxide particles dispersed in water) for the purpose of separating/isolating individual graphene oxide sheets from graphite oxide particles. This is based on the notion that the inter-graphene plane separation has been increased from 0.3354 nm in natural graphite to 0.6-1.1 nm in highly oxidized graphite oxide, significantly weakening the van der Waals forces that hold neighboring planes together. Ultrasonic power can be sufficient to further separate graphene plane sheets to form fully separated, isolated, or discrete graphene oxide (GO) sheets. These graphene oxide sheets can then be chemically or thermally reduced to obtain "reduced graphene oxides" (RGO) typically having an oxygen content of 0.001%-10% by weight, more typically 0.01%-5% by weight, most typically and preferably less than 2% by weight of oxygen.

For the purpose of defining the claims of the instant application, NGPs or graphene materials include discrete sheets/platelets of single-layer and multi-layer (typically less than 10 layers) pristine graphene, graphene oxide, reduced graphene oxide (RGO), graphene fluoride, graphene chloride, graphene bromide, graphene iodide, hydrogenated graphene, nitrogenated graphene, chemically functionalized graphene, doped graphene (e.g. doped by B or N). Pristine graphene has essentially 0% oxygen. RGO typically has an oxygen content of 0.001%-5% by weight. Graphene oxide (including RGO) can have 0.001%-50% by weight of oxygen. Other than pristine graphene, all the graphene materials have 0.001%-50% by weight of non-carbon elements (e.g. O, H, N, B, F, Cl, Br, I, etc.). These materials are herein referred to as non-pristine graphene materials.

Pristine graphene, in smaller discrete graphene sheets (typically 0.3 μm to 10 μm), may be produced by direct ultrasonication (also known as liquid phase exfoliation or production) or supercritical fluid exfoliation of graphite particles. These processes are well-known in the art.

The graphene oxide (GO) may be obtained by immersing powders or filaments of a starting graphitic material (e.g. natural graphite powder) in an oxidizing liquid medium (e.g. a mixture of sulfuric acid, nitric acid, and potassium permanganate) in a reaction vessel at a desired temperature for a period of time (typically from 0.5 to 96 hours, depending upon the nature of the starting material and the type of oxidizing agent used). As previously described above, the resulting graphite oxide particles may then be subjected to thermal exfoliation or ultrasonic wave-induced exfoliation to produce isolated GO sheets. These GO sheets can then be converted into various graphene materials by substituting —OH groups with other chemical groups (e.g. —Br, $NH_2$, etc.).

Fluorinated graphene or graphene fluoride is herein used as an example of the halogenated graphene material group. There are two different approaches that have been followed to produce fluorinated graphene: (1) fluorination of pre-synthesized graphene: This approach entails treating graphene prepared by mechanical exfoliation or by CVD growth with fluorinating agent such as $XeF_2$, or F-based plasmas; (2) Exfoliation of multilayered graphite fluorides: Both mechanical exfoliation and liquid phase exfoliation of graphite fluoride can be readily accomplished.

Interaction of $F_2$ with graphite at high temperature leads to covalent graphite fluorides $(CF)_n$ or $(C_2F)_n$, while at low temperatures graphite intercalation compounds (GIC) $C_xF$ ($2 \leq x \leq 24$) form. In $(CF)_n$ carbon atoms are sp3-hybridized and thus the fluorocarbon layers are corrugated consisting of trans-linked cyclohexane chairs. In $(C_2F)_n$ only half of the C atoms are fluorinated and every pair of the adjacent carbon sheets are linked together by covalent C—C bonds. Systematic studies on the fluorination reaction showed that the resulting F/C ratio is largely dependent on the fluorination temperature, the partial pressure of the fluorine in the fluorinating gas, and physical characteristics of the graphite precursor, including the degree of graphitization, particle size, and specific surface area. In addition to fluorine ($F_2$), other fluorinating agents may be used, although most of the available literature involves fluorination with $F_2$ gas, sometimes in presence of fluorides.

For exfoliating a layered precursor material to the state of individual layers or few-layers, it is necessary to overcome the attractive forces between adjacent layers and to further stabilize the layers. This may be achieved by either covalent modification of the graphene surface by functional groups or by non-covalent modification using specific solvents, surfactants, polymers, or donor-acceptor aromatic molecules. The process of liquid phase exfoliation includes ultrasonic treatment of a graphite fluoride in a liquid medium.

The nitrogenation of graphene can be conducted by exposing a graphene material, such as graphene oxide, to ammonia at high temperatures (200-400° C.). Nitrogenated graphene could also be formed at lower temperatures by a hydrothermal method; e.g. by sealing GO and ammonia in an autoclave and then increased the temperature to 150-250° C. Other methods to synthesize nitrogen doped graphene include nitrogen plasma treatment on graphene, arc-discharge between graphite electrodes in the presence of ammonia, ammonolysis of graphene oxide under CVD conditions, and hydrothermal treatment of graphene oxide and urea at different temperatures.

The aforementioned features are further described and explained in detail as follows: As illustrated in FIG. 4(B), a graphite particle (e.g. 100) is typically composed of multiple graphite crystallites or grains. A graphite crystallite is made up of layer planes of hexagonal networks of carbon atoms. These layer planes of hexagonally arranged carbon atoms are substantially flat and are oriented or ordered so as to be substantially parallel and equidistant to one another in a particular crystallite. These layers of hexagonal-structured carbon atoms, commonly referred to as graphene layers or basal planes, are weakly bonded together in their thickness direction (crystallographic c-axis direction) by weak van der Waals forces and groups of these graphene layers are arranged in crystallites. The graphite crystallite structure is usually characterized in terms of two axes or directions: the c-axis direction and the a-axis (or b-axis) direction. The c-axis is the direction perpendicular to the basal planes. The a- or b-axes are the directions parallel to the basal planes (perpendicular to the c-axis direction).

Due to the weak van der Waals forces holding the parallel graphene layers, natural graphite can be treated so that the spacing between the graphene layers can be appreciably opened up so as to provide a marked expansion in the c-axis direction, and thus form an expanded graphite structure in which the laminar character of the carbon layers is substantially retained. The process for manufacturing flexible graphite is well-known in the art. In general, flakes of natural graphite (e.g. 100 in FIG. 4(B)) are intercalated in an acid solution to produce graphite intercalation compounds (GICs, 102). The GICs are washed, dried, and then exfoliated by exposure to a high temperature for a short period of time. This causes the flakes to expand or exfoliate in the c-axis direction of the graphite up to 80-300 times of their original dimensions. The exfoliated graphite flakes are vermiform in appearance and, hence, are commonly referred to as graphite worms 104. These worms of graphite flakes which have been greatly expanded can be formed without the use of a binder into cohesive or integrated sheets of expanded graphite, e.g. webs, papers, strips, tapes, foils, mats or the like (typically referred to as "flexible graphite" 106) having a typical density of about 0.04-2.0 g/cm$^3$ for most applications.

Acids, such as sulfuric acid, are not the only type of intercalating agent (intercalant) that penetrate into spaces between graphene planes to obtain GICs. Many other types of intercalating agents, such as alkali metals (Li, K, Na, Cs, and their alloys or eutectics), can be used to intercalate graphite to stage 1, stage 2, stage 3, etc. Stage n implies one intercalant layer for every n graphene planes. For instance, a stage-1 potassium-intercalated GIC means there is one layer of K for every graphene plane; or, one can find one layer of K atoms inserted between two adjacent graphene planes in a G/K/G/K/G/KG . . . sequence, where G is a graphene plane and K is a potassium atom plane. A stage-2 GIC will have a sequence of GG/K/GG/K/GG/K/GG . . . and a stage-3 GIC will have a sequence of GGG/K/GGG/K/GGG . . . , etc. These GICs can then be brought in contact with water or water-alcohol mixture to produce exfoliated graphite and/or separated/isolated graphene sheets.

Exfoliated graphite worms may be subjected to high-intensity mechanical shearing/separation treatments using a high-intensity air jet mill, high-intensity ball mill, or ultrasonic device to produce separated nano graphene platelets (NGPs) with all the graphene platelets thinner than 100 nm, mostly thinner than 10 nm, and, in many cases, being single-layer graphene (also illustrated as 112 in FIG. 4(B)). An NGP is composed of a graphene sheet or a plurality of graphene sheets with each sheet being a two-dimensional, hexagonal structure of carbon atoms. A mass of multiple NGPs (including discrete sheets/platelets of single-layer and/or few-layer graphene or graphene oxide may be made into a graphene film/paper (114 in FIG. 4(B)) using a film- or paper-making process. Alternatively, with a low-intensity shearing, graphite worms tend to be separated into the so-called expanded graphite flakes (108 in FIG. 4(B) having a thickness >100 nm. These flakes can be formed into graphite paper or mat 106 using a paper- or mat-making process, with or without a resin binder. Expanded graphite flakes can be used as a conductive filler in a battery. Separated NGPs (individual single-layer or multi-layer graphene sheets) can be used as an anode active material or as a supporting conductive material in the cathode of an alkali metal-sulfur battery.

There is no restriction on the types of anode active materials or cathode active materials that can be used in practicing the instant invention. In one preferred embodiment, the anode active material is selected from the group consisting of: (a) Sodium- or lithium-doped silicon (Si), germanium (Ge), tin (Sn), lead (Pb), antimony (Sb), bismuth (Bi), zinc (Zn), aluminum (Al), titanium (Ti), cobalt (Co), nickel (Ni), manganese (Mn), cadmium (Cd), and mixtures thereof; (b) Sodium- or lithium-containing alloys or intermetallic compounds of Si, Ge, Sn, Pb, Sb, Bi, Zn, Al, Ti, Co, Ni, Mn, Cd, and their mixtures; (c) Sodium- or lithium-containing oxides, carbides, nitrides, sulfides, phosphides, selenides, tellurides, or antimonides of Si, Ge, Sn, Pb, Sb, Bi, Zn, Al, Fe, Ti, Co, Ni, Mn, Cd, and mixtures or composites thereof; (d) Sodium or lithium salts; and (e) Graphene sheets pre-loaded or pre-attached with sodium or lithium (herein referred to as pre-sodiated or pre-lithiated graphene sheets).

In the rechargeable alkali metal-sulfur battery, the anode may contain an alkali ion source selected from an alkali metal, an alkali metal alloy, a mixture of alkali metal or alkali metal alloy with an alkali intercalation compound, an alkali element-containing compound, or a combination thereof. Particularly desired is an anode active material that contains an alkali intercalation compound selected from petroleum coke, carbon black, amorphous carbon, hard carbon, templated carbon, hollow carbon nanowires, hollow carbon sphere, natural graphite, artificial graphite, lithium or sodium titanate, $NaTi_2(PO_4)_3$, $Na_2Ti_3O_7$ (Sodium titanate), $Na_2C_8H_4O_4$ (Disodium Terephthalate), $Na_2TP$ (Sodium Terephthalate), $TiO_2$, $Na_xTiO_2$ (x=0.2 to 1.0), carboxylate based materials, $C_8H_4Na_2O_4$, $C_8H_6O_4$, $C_8H_5NaO_4$, $C_8Na_2F_4O_4$, $C_{10}H_2Na_4O_8$, $C_{14}H_4O_6$, $C_{14}H_4Na_4O_8$, or a combination thereof. In an embodiment, the anode may contain a mixture of 2 or 3 types of anode active materials (e.g. mixed particles of activated carbon+$NaTi_2(PO_4)_3$ or a mixture of Li particles and graphite particles).

The first or second liquid electrolyte in the invented process or battery may be selected from an aqueous electrolyte, organic electrolyte, ionic liquid electrolyte, mixture of an organic electrolyte and an ionic electrolyte, or a mixture thereof with a polymer. In some embodiments, the aqueous electrolyte contains a sodium salt or a potassium salt dissolved in water or a mixture of water and alcohol. In some embodiments, the sodium salt or potassium salt is selected from $Na_2SO_4$, $K_2SO_4$, a mixture thereof, NaOH, LiOH, NaCl, LiCl, NaF, LiF, NaBr, LiBr, NaI, LiI, or a mixture thereof.

The organic solvent may contain a liquid solvent selected from the group consisting of 1,3-dioxolane (DOL), 1,2-dimethoxyethane (DME), tetraethylene glycol dimethylether (TEGDME), poly(ethylene glycol) dimethyl ether (PEGDME), diethylene glycol dibutyl ether (DEGDBE), 2-ethoxyethyl ether (EEE), sulfone, sulfolane, ethylene carbonate (EC), dimethyl carbonate (DMC), methylethyl carbonate (MEC), diethyl carbonate (DEC), ethyl propionate, methyl propionate, propylene carbonate (PC), gamma-butyrolactone (γ-BL), acetonitrile (AN), ethyl acetate (EA), propyl formate (PF), methyl formate (MF), toluene, xylene, methyl acetate (MA), fluoroethylene carbonate (FEC), vinylene carbonate (VC), allyl ethyl carbonate (AEC), a hydrofloroether (e.g. methyl perfluorobutyl ether, MFE, or ethyl perfluorobutyl ether, EFE), and combinations thereof.

The organic electrolyte may contain an alkali metal salt preferably selected from sodium perchlorate ($NaClO_4$), potassium perchlorate ($KClO_4$), sodium hexafluorophosphate ($NaPF_6$), potassium hexafluorophosphate ($KPF_6$), sodium borofluoride ($NaBF_4$), potassium borofluoride ($KBF_4$), sodium hexafluoroarsenide, potassium hexafluoroarsenide, sodium trifluoro-metasulfonate ($NaCF_3SO_3$), potassium trifluoro-metasulfonate ($KCF_3SO_3$), bis-trifluoromethyl sulfonylimide sodium ($NaN(CF_3SO_2)_2$), bis-trifluoromethyl sulfonylimide potassium ($KN(CF_3SO_2)_2$), an ionic liquid salt, or a combination thereof.

The electrolyte may contain a lithium salt selected from lithium perchlorate ($LiClO_4$), lithium hexafluorophosphate ($LiPF_6$), lithium borofluoride ($LiBF_4$), lithium hexafluoroarsenide ($LiAsF_6$), lithium trifluoro-metasulfonate ($LiCF_3SO_3$), bis-trifluoromethyl sulfonylimide lithium ($LiN(CF_3SO_2)_2$), lithium bis(oxalato)borate (LiBOB), lithium oxalyldifluoroborate ($LiBF_2C_2O_4$), lithium oxalyl-difluoroborate ($LiBF_2C_2O_4$), lithium nitrate ($LiNO_3$), Li-Fluoroalkyl-Phosphates ($LiPF_3(CF_2CF_3)_3$), lithium bisperfluoroethysulfonylimide (LiBETI), lithium bis(trifluoromethanesulphonyl)imide, lithium bis(fluorosulphonyl) imide, lithium trifluoromethanesulfonimide (LiTFSI), an ionic liquid lithium salt, or a combination thereof.

The ionic liquid is composed of ions only. Ionic liquids are low melting temperature salts that are in a molten or liquid state when above a desired temperature. For instance, an ionic salt is considered as an ionic liquid if its melting point is below 100° C. If the melting temperature is equal to or lower than room temperature (25° C.), the salt is referred to as a room temperature ionic liquid (RTIL). The IL-based lithium salts are characterized by weak interactions, due to the combination of a large cation and a charge-delocalized anion. This results in a low tendency to crystallize due to flexibility (anion) and asymmetry (cation).

Some ILs may be used as a co-solvent (not as a salt) to work with the first organic solvent of the present invention. A well-known ionic liquid is formed by the combination of a 1-ethyl-3-methyl-imidazolium (EMI) cation and an N,N-bis(trifluoromethane)sulphonamide (TFSI) anion. This combination gives a fluid with an ionic conductivity comparable to many organic electrolyte solutions, a low decomposition propensity and low vapor pressure up to ~300-400° C. This implies a generally low volatility and non-flammability and, hence, a much safer electrolyte solvent for batteries.

Ionic liquids are basically composed of organic or inorganic ions that come in an unlimited number of structural variations owing to the preparation ease of a large variety of their components. Thus, various kinds of salts can be used to design the ionic liquid that has the desired properties for a given application. These include, among others, imidazolium, pyrrolidinium and quaternary ammonium salts as cations and bis(trifluoromethanesulphonyl) imide, bis(fluorosulphonyl)imide and hexafluorophosphate as anions. Useful ionic liquid-based sodium salts (not solvent) may be composed of sodium ions as the cation and bis(trifluoromethanesulphonyl)imide, bis(fluorosulphonyl)imide or hexafluorophosphate as anions. For instance, sodium trifluoromethanesulfonimide (NaTFSI) is a particularly useful sodium salt.

Based on their compositions, ionic liquids come in different classes that include three basic types: aprotic, protic and zwitterionic types, each one suitable for a specific application. Common cations of room temperature ionic liquids (RTILs) include, but are not limited to, tetraalkylammonium, di, tri, and tetra-alkylimidazolium, alkylpyridinium, dialkyl-pyrrolidinium, dialkylpiperidinium, tetraalkylphosphonium, and trialkylsulfonium. Common anions of RTILs include, but are not limited to, $BF_4^-$, $B(CN)_4^-$, $CH_3BF_3^-$, $CH_2CHBF_3^-$, $CF_3BF_3^-$, $C_2F_5BF_3^-$, $n-C_3F_7BF_3^-$, $n-C_4F_9BF_3^-$, $PF_6^-$, $CF_3CO_2^-$, $CF_3SO_3^-$, $N(SO_2CF_3)_2^-$, $N(COCF_3)(SO_2CF_3)^-$, $N(SO_2F)_2^-$, $N(CN)_2^-$, $C(CN)_3^-$, $SCN^-$, $SeCN^-$, $CuCl_2^-$, $AlCl_4^-$, $F(HF)_{2.3}^-$, etc. Relatively speaking, the combination of imidazolium- or sulfonium-based cations and complex halide anions such as $AlCl_4^-$, $BF_4^-$, $CF_3CO_2^-$, $CF_3SO_3^-$, $NTf_2^-$, $N(SO_2F)_2^-$, or $F(HF)_{2.3}^-$ results in RTILs with good working conductivities.

RTILs can possess archetypical properties such as high intrinsic ionic conductivity, high thermal stability, low volatility, low (practically zero) vapor pressure, non-flammability, the ability to remain liquid at a wide range of temperatures above and below room temperature, high polarity, high viscosity, and wide electrochemical windows. These properties, except for the high viscosity, are desirable attributes when it comes to using an RTIL as an electrolyte co-solvent in a rechargeable lithium cell.

The specific capacity and specific energy of a Li—S cell or Na—S cell are dictated by the actual amount of sulfur that can be implemented in the cathode active layer (relative to other non-active ingredients, such as the binder resin and conductive filler) and the utilization rate of this sulfur amount (i.e. the utilization efficiency of the cathode active material or the actual proportion of S that actively participates in storing and releasing lithium ions). A high-capacity and high-energy Li—S or Na—S cell requires a high amount of S in the cathode active layer (i.e. relative to the amounts of non-active materials, such as the binder resin, conductive additive, and other modifying or supporting materials) and a high S utilization efficiency). The present invention provides such a cathode active layer and a method of producing such a cathode active layer (e.g. a pre-sulfurized active cathode layer). As an example of sulfur pre-loading procedures, this method comprises the following four steps, (a)-(d):

a) Preparing a layer of porous graphene structure having massive graphene surfaces with a specific surface area greater than 100 $m^2/g$ (these surfaces must be accessible to electrolyte). The porous graphene structure have a specific surface area preferably >500 $m^2/g$ and more preferably >700 $m^2/g$, and most preferably >1,000 $m^2/g$.

b) Preparing an electrolyte comprising a solvent (non-aqueous solvent, such as organic solvent and or ionic liquid) and a sulfur source dissolved or dispersed in the solvent;

c) Preparing an anode;

d) Bringing the integral layer of porous graphene structure and the anode in ionic contact with the electrolyte (e.g. by immersing all these components in a chamber that is external to the intended Li—S cell, or encasing these three components inside the Li—S cell) and imposing an electric current between the anode and the integral layer of porous graphene structure (serving as a cathode) with a sufficient current density for a sufficient period of time to electrochemically deposit nano-scaled sulfur particles or coating on the graphene surfaces to form a pre-sulfurized graphene layer;

e) Pulverizing this pre-sulfurized layer to produce isolated S-coated graphene sheets. These sheets can be injected or impregnated into the pores of a cathode current collector foam (porous conductive structure) to make the cathode.

The layer of porous graphene structure recited in step (a) contains a graphene material or an exfoliated graphite material, wherein the graphene material is selected from pristine graphene, graphene oxide, reduced graphene oxide, graphene fluoride, graphene chloride, graphene bromide, graphene iodide, hydrogenated graphene, nitrogenated graphene, boron-doped graphene, nitrogen-doped graphene, chemically functionalized graphene, or a combination thereof, and wherein the exfoliated graphite material is selected from exfoliated graphite worms, expanded graphite flakes, or recompressed graphite worms or flakes (must still exhibit a high specific surface area, >>100 $m^2/g$, accessible to electrolyte). It is surprising to discover that multiple graphene sheets can be packed together to form a sulfur-based electrode layer of structural integrity without the need for a binder resin, and such a layer can hold its shape and functions during repeated charges and discharges of the resulting Li—S cell.

The S particles or coating have a thickness or diameter smaller than 20 nm (preferably <10 nm, more preferably <5 nm, and further preferably <3 nm) and wherein the nano-scaled sulfur particles or coating occupy a weight fraction of at least 70% (preferably >80%, more preferably >90%, and most preferably >95%) based on the total weights of the sulfur particles or coating and the graphene material combined. It is advantageous to deposit as much S as possible yet still maintain ultra-thin thickness or diameter of the S coating or particles (e.g. >80% and <3 nm; >90% and <5 nm; and >95% and <10 nm, etc.).

Once a layer of porous graphene structure is prepared, this layer can be immersed in an electrolyte (preferably liquid electrolyte), which comprises a solvent and a sulfur source dissolved or dispersed in the solvent. This layer basically serves as a cathode in an external electrochemical deposition chamber.

Subsequently, an anode layer is also immersed in the chamber. Any conductive material can be used as an anode material, but preferably this layer contains some lithium or sodium. In such an arrangement, the layer of porous graphene structure and the anode are in ionic contact with the electrolyte. An electric current is then supplied between the anode and the integral layer of porous graphene structure (serving as a cathode) with a sufficient current density for a sufficient period of time to electrochemically deposit nano-scaled sulfur particles or coating on the graphene surfaces to form the pre-sulfurized active cathode layer. The required current density depends upon the desired speed of deposition and uniformity of the deposited material.

This current density can be readily adjusted to deposit S particles or coating that have a thickness or diameter smaller than 20 nm (preferably <10 nm, more preferably <5 nm, and further preferably <3 nm). The resulting nano-scaled sulfur particles or coating occupy a weight fraction of at least 70% (preferably >80%, more preferably >90%, and most preferably >95%) based on the total weights of the sulfur particles or coating and the graphene material combined.

In one preferred embodiment, the sulfur source is selected from $M_xS_y$, wherein x is an integer from 1 to 3 and y is an integer from 1 to 10, and M is a metal element selected from an alkali metal, an alkaline metal selected from Mg or Ca, a transition metal, a metal from groups 13 to 17 of the periodic table, or a combination thereof. In a desired embodiment, the metal element M is selected from Li, Na, K, Mg, Zn, Cu, Ti, Ni, Co, Fe, or Al. In a particularly desired embodiment, $M_xS_y$ is selected from $Li_2S_6$, $Li_2S_7$, $Li_2S_8$, $Li_2S_9$, $Li_2S_{10}$, $Na_2S_6$, $Na_2S_7$, $Na_2S_8$, $Na_2S_9$, $Na_2S_{10}$, $K_2S_6$, $K_2S_7$, $K_2S_8$, $K_2S_9$, or $K_2S_{10}$.

In one embodiment, the anode comprises an anode active material selected from an alkali metal, an alkaline metal, a transition metal, a metal from groups 13 to 17 of the periodic table, or a combination thereof. This anode can be the same anode intended for inclusion in a Li—S cell.

The solvent and lithium or sodium salt used in the electrochemical deposition chamber may be selected from any solvent or salt in the list given above for a lithium-sulfur or sodium-sulfur battery.

After an extensive and in-depth research effort, we have come to realize that such a pre-sulfurization surprisingly solves several most critical issues associated with current Li—S or Na—S cells. For instance, this method enables the sulfur to be deposited in a thin coating or ultra-fine particle form, thus, providing ultra-short lithium ion diffusion paths and, hence, ultra-fast reaction times for fast battery charges and discharges. This is achieved while maintaining a relatively high proportion of sulfur (the active material responsible for storing lithium) and, thus, high specific lithium storage capacity of the resulting cathode active layer in terms of high specific capacity (mAh/g, based on the total weight of the cathode layer, including the masses of the active material, S, supporting graphene sheets, binder resin, and conductive filler).

It is of significance to note that one might be able to use a prior art procedure to deposit small S particles, but not a high S proportion, or to achieve a high proportion but only in large particles or thick film form. But, the prior art procedures have not been able to achieve both at the same time. This is why it is such an unexpected and highly advantageous thing to obtain a high sulfur loading and yet, concurrently, maintaining an ultra-thin/small thickness/diameter of sulfur. This has not been possible with any prior art sulfur loading techniques. For instance, we have been able to deposit nano-scaled sulfur particles or coating that occupy a >90% weight fraction of the cathode layer and yet maintaining a coating thickness or particle diameter <3 nm. This is quite a feat in the art of lithium-sulfur batteries. As another example, we have achieved a >95% S loading at an average S coating thickness of 4.8-7 nm.

Electrochemists or materials scientists in the art of Li—S batteries would expect that a greater amount of highly conducting graphene sheets or graphite flakes (hence, a smaller amount of S) in the cathode active layer should lead to a better utilization of S, particularly under high charge/discharge rate conditions. Contrary to these expectations, we have observed that the key to achieving a high S utilization efficiency is minimizing the S coating or particle size and is independent of the amount of S loaded into the cathode provided the S coating or particle thickness/diameter is small enough (e.g. <10 nm, or even-better if <5 nm). The problem here is that it has not been possible to maintain a thin S coating or small particle size if S is higher than 50% by weight. Here we have further surprisingly observed that the key to enabling a high specific capacity at the cathode under high rate conditions is to maintain a high S loading and still keep the S coating or particle size as small as possible, and this is accomplished by using the presently invented pre-sulfurization method.

The electrons coming from or going out through the external load or circuit must go through the conductive additives (in a conventional sulfur cathode) or a conductive framework (e.g. exfoliated graphite meso-porous structure or nano-structure of conductive graphene sheets as herein disclosed) to reach the cathode active material. Since the cathode active material (e.g. sulfur or lithium polysulfide) is a poor electronic conductor, the active material particle or coating must be as thin as possible to reduce the required electron travel distance.

Furthermore, the cathode in a conventional Li—S cell typically has less than 70% by weight of sulfur in a composite cathode composed of sulfur and the conductive additive/support. Even when the sulfur content in the prior art composite cathode reaches or exceeds 70% by weight, the specific capacity of the composite cathode is typically significantly lower than what is expected based on theoretical predictions. For instance, the theoretical specific capacity of sulfur is 1,675 mAh/g. A composite cathode composed of 70% sulfur (S) and 30% carbon black (CB), without any binder, should be capable of storing up to 1,675×70%=1,172 mAh/g. Unfortunately, the observed specific capacity is typically less than 75% or 879 mAh/g (often less than 50% or 586 mAh/g in this example) of what could be achieved. In other words, the active material utilization rate is typically less than 75% (or even <50%). This has been a major issue in the art of Li—S cells and there has been no solution to this problem. Most surprisingly, the implementation of massive graphene surfaces associated with a porous graphene structure as a conductive supporting material for sulfur or lithium polysulfide has made it possible to achieve an active material utilization rate of typically >>80%, more often greater than 90%, and, in many cases, close to 95%-99%.

Alternatively, the cathode active material (S or polysulfide) may be deposited on or bonded by a functional material or nano-structured material. The functional material or nano-structured material may be selected from the group consisting of (a) a nano-structured or porous disordered carbon material selected from a soft carbon, hard carbon, polymeric carbon or carbonized resin, meso-phase carbon, coke, carbonized pitch, carbon black, activated carbon, nano-cellular carbon foam or partially graphitized carbon; (b) a nano graphene platelet selected from a single-layer graphene sheet or multi-layer graphene platelet; (c) a carbon nanotube selected from a single-walled carbon nanotube or multi-walled carbon nanotube; (d) a carbon nano-fiber, nano-wire, metal oxide nano-wire or fiber, conductive polymer nano-fiber, or a combination thereof; (e) a carbonyl-containing organic or polymeric molecule; (f) a functional material containing a carbonyl, carboxylic, or amine group; and combinations thereof. In a preferred embodiment, the functional material or nano-structured material has a specific surface area of at least 500 $m^2/g$, preferably at least 1,000 $m^2/g$.

Typically, the cathode active materials are not electrically conducting. Hence, in one embodiment, the cathode active material may be mixed with a conductive filler, such as carbon black (CB), acetylene black (AB), graphite particles, expanded graphite particles, activated carbon, meso-porous carbon, meso-carbon micro bead (MCMB), carbon nano-tube (CNT), carbon nano-fiber (CNF), graphene sheet (also referred to as nano graphene platelet, NGP), carbon fiber, or a combination thereof. These carbon/graphite/graphene materials, containing sulfur or polysulfide, may be made into fine particles as the cathode active material in the invented Li—S or Na—S cell.

In a preferred embodiment, the nano-scaled filaments (e.g. CNTs, CNFs, and/or NGPs) are formed into a porous nano-structure that contains massive surfaces to support either the anode active material (e.g. Na or Li coating) or the cathode active material (e.g. S). The porous nano-structure should have pores having a pore size preferably from 2 nm to 50 nm, preferably 2 nm-10 nm. These pores are properly sized to accommodate the electrolyte at the cathode side and to retain the cathode active material in the pores during repeated charges/discharges. The same type of nano-structure may be implemented at the anode side to support the anode active material.

At the anode side, when an alkali metal is used as the sole anode active material in an alkali metal cell, there is concern about the formation of dendrites, which could lead to internal shorting and thermal runaway. Herein, we have used two approaches, separately or in combination, to addressing this dendrite formation issue: one involving the use of a high-concentration electrolyte and the other the use of a nano-structure composed of conductive nano-filaments to support the alkali metal at the anode. The nano-filament may be selected from, as examples, a carbon nano fiber (CNF), graphite nano fiber (GNF), carbon nano-tube (CNT), metal nano wire (MNW), conductive nano-fibers obtained by electro-spinning, conductive electro-spun composite nano-fibers, nano-scaled graphene platelet (NGP), or a combination thereof. The nano-filaments may be bonded by a binder material selected from a polymer, coal tar pitch, petroleum pitch, meso-phase pitch, coke, or a derivative thereof.

Surprisingly and significantly, the nano-structure provides an environment that is conducive to uniform deposition of alkali metal ions during the battery re-charge, to the extent that no geometrically sharp structures or dendrites were found in the anode after a large number of cycles. Not wishing to be bound by any theory, but the applicants envision that the 3-D network of highly conductive nano-filaments provide a substantially uniform attraction of alkali metal ions back onto the filament surfaces during re-charging. Furthermore, due to the nanometer sizes of the filaments, there is a large amount of surface area per unit volume or per unit weight of the nano-filaments. This ultra-high specific surface area offers the alkali metal ions an opportunity to uniformly deposit a thin coating on filament surfaces. The high surface area readily accepts a large amount of alkali metal ions in the liquid electrolyte, enabling high re-charge rates for an alkali metal secondary battery.

EXAMPLES

In the examples discussed below, unless otherwise noted, raw materials such as silicon, germanium, bismuth, antimony, zinc, iron, nickel, titanium, cobalt, and tin were obtained from either Alfa Aesar of Ward Hill, Mass., Aldrich Chemical Company of Milwaukee, Wis. or Alcan Metal Powders of Berkeley, Calif. X-ray diffraction patterns were collected using a diffractometer equipped with a copper target x-ray tube and a diffracted beam monochromator. The presence or absence of characteristic patterns of peaks was observed for each of the alloy samples studied. For example, a phase was considered to be amorphous when the X-ray diffraction pattern was absent or lacked sharp, well-defined peaks. In several cases, scanning electron microscopy (SEM) and transmission electron microscopy (TEM) were used to characterize the structure and morphology of the hybrid material samples.

In what follows, we provide some examples of several different types of anode active materials, cathode active materials, and porous current collector materials (e.g. graphite foam, graphene foam, and metal foam) to illustrate the best mode of practicing the instant invention. Theses illustrative examples and other portions of instant specification and drawings, separately or in combinations, are more than adequate to enable a person of ordinary skill in the art to practice the instant invention. However, these examples should not be construed as limiting the scope of instant invention.

Example 1: Illustrative Examples of Conductive Porous Layers (Foamed Current Collectors)

Various types of metal foams and fine metal webs/screens are commercially available; e.g. Ni foam, Cu foam, Al foam, Ti foam, Ni mesh/web, stainless steel fiber mesh, etc. These conductive foam structures were used in the present study as an anode or cathode conductive porous layers (foam current collectors). In addition, metal-coated polymer foams and carbon foams were also used as current collectors.

Example 2: Ni Foam and CVD Graphene Foam-Based Current Collectors (Conductive Porous Layers) on Ni Foam Templates The procedure for producing CVD graphene foam was adapted from that disclosed in open literature: Chen, Z. et al. "Three-dimensional flexible and conductive interconnected graphene networks grown by chemical vapor deposition," Nature Materials, 10, 424-428 (2011). Nickel foam, a porous structure with an interconnected 3D scaffold of nickel was chosen as a template for the growth of graphene foam. Briefly, carbon was introduced into a nickel foam by decomposing $CH_4$ at 1,000° C. under ambient pressure, and graphene films were then deposited on the surface of the nickel foam. Due to the difference in the thermal expansion coefficients between nickel and graphene, ripples and wrinkles were formed on the graphene films. Four types of foams made in this example were used as a current collector in the presently invented lithium batteries: Ni foam, CVD graphene-coated Ni form, CVD graphene foam (Ni being etched away), and conductive polymer bonded CVD graphene foam.

In order to recover (separate) graphene foam from the supporting Ni foam, Ni frame was etched away. In the procedure proposed by Chen, et al., before etching away the nickel skeleton by a hot HCl (or $FeCl_3$) solution, a thin layer of poly (methyl methacrylate) (PMMA) was deposited on the surface of the graphene films as a support to prevent the graphene network from collapsing during nickel etching. After the PMMA layer was carefully removed by hot acetone, a fragile graphene foam sample was obtained. The use of the PMMA support layer was considered critical to preparing a free-standing film of graphene foam. Instead, we used a conducting polymer as a binder resin to hold graphene together while Ni was etched away. It may be noted that the CVD graphene foam used herein is intended as a foamed current collector to accommodate a suspension of active material dispersed in a liquid electrolyte. For instance, hard carbon nano particles were injected along with a liquid electrolyte in the anode and graphene-supported sulfur nano particles injected along with a liquid electrolyte in the cathode.

Example 3: Graphitic Foam-Based Current Collectors from Pitch-Based Carbon Foams Pitch powder, granules, or pellets are placed in a aluminum mold with the desired final shape of the foam. Mitsubishi ARA-24 meso-phase pitch was utilized. The sample is evacuated to less than 1 torr and then heated to a temperature approximately 300° C. At this point, the vacuum was released to a nitrogen blanket and then a pressure of up to 1,000 psi was applied. The temperature of the system was then raised to 800° C. This was performed at a rate of 2 degree C./min. The temperature was held for at least 15 minutes to achieve a soak and then the furnace power was turned off and cooled to room temperature at a rate of approximately 1.5 degree C./min with release of pressure at a rate of approximately 2 psi/min. Final foam temperatures were 630° C. and 800° C. During the cooling cycle, pressure is released gradually to atmospheric conditions. The foam was then heat treated to 1050° C. (carbonized) under a nitrogen blanket and then heat treated in separate runs in a graphite crucible to 2500° C. and 2800° C. (graphitized) in Argon.

Example 4: Some Examples of Electrolytes Used

Preferred non-lithium alkali metal salts include: sodium perchlorate ($NaClO_4$), potassium perchlorate ($KClO_4$), sodium hexafluorophosphate ($NaPF_6$), potassium hexafluorophosphate ($KPF_6$), sodium borofluoride ($NaBF_4$), potassium borofluoride ($KBF_4$), sodium hexafluoroarsenide, potassium hexafluoroarsenide, sodium trifluoro-metasulfonate ($NaCF_3SO_3$), potassium trifluoro-metasulfonate ($KCF_3SO_3$), bis-trifluoromethyl sulfonylimide sodium (NaN($CF_3SO_2$)$_2$), and bis-trifluoromethyl sulfonylimide potassium [KN($CF_3SO_2$)$_2$].

For aqueous electrolyte, sodium salt or potassium salt is preferably selected from $Na_2SO_4$, $K_2SO_4$, a mixture thereof, NaOH, KOH, NaCl, KCl, NaF, KF, NaBr, KBr, NaI, KI, or a mixture thereof. The salt concentrations used in the present study were from 0.3M to 3.0 M (most often 0.5M to 2.0M).

A wide range of lithium salts dissolved in an organic liquid solvent (alone or in a mixture with another organic liquid or an ionic liquid) were used in the present study. We observed that the following lithium salts could be dissolved well in selected organic or ionic liquid solvents:lithium borofluoride ($LiBF_4$), lithium trifluoro-metasulfonate ($LiCF_3SO_3$), lithium bis-trifluoromethyl sulfonylimide (LiN($CF_3SO_2$)$_2$ or LITFSI), lithium bis(oxalato)borate (LiBOB), lithium oxalyldifluoroborate ($LiBF_2C_2O_4$), and lithium bisperfluoroethy-sulfonylimide (LiBETI). A good electrolyte additive for helping to stabilize Li metal is $LiNO_3$. Particularly useful ionic liquid-based lithium salts include: lithium bis(trifluoro methanesulfonyl)imide (LiTFSI).

Preferred organic liquid solvents include: ethylene carbonate (EC), dimethyl carbonate (DMC), methylethyl carbonate (MEC), diethyl carbonate (DEC), propylene carbonate (PC), acetonitrile (AN), vinylene carbonate (VC), allyl ethyl carbonate (AEC), 1,3-dioxolane (DOL), 1,2-dimethoxyethane (DME), tetraethylene glycol dimethylether (TEGDME), Poly(ethylene glycol) dimethyl ether (PEGDME), diethylene glycol dibutyl ether (DEGDBE), 2-ethoxyethyl ether (EEE), hydrofloroether (e.g. TPTP), sulfone, and sulfolane.

Preferred ionic liquid solvents may be selected from a room temperature ionic liquid (RTIL) having a cation selected from tetraalkylammonium, di-alkylimidazolium, alkylpyridinium, dialkyl-pyrrolidinium, or dialkylpiperidinium. The counter anion is preferably selected from $BF_4^-$, $B(CN)_4^-$, $CF_3CO_2^-$, $CF_3SO_3^-$, $N(SO_2CF_3)_2^-$, $N(COCF_3)(SO_2CF_3)^-$, or $N(SO_2F)_2^-$. Particularly useful ionic liquid-based solvents include N-n-butyl-N-ethylpyrrolidinium bis(trifluoromethane sulfonyl)imide (BEPyTFSI), N-methyl-N-propylpiperidinium bis(trifluoromethyl sulfonyl)imide ($PP_{13}$TFSI), and N,N-diethyl-N-methyl-N-(2-methoxyethyl) ammonium bis(trifluoromethylsulfonyl)imide.

Example 4: Preparation of Graphene Oxide (GO) and Reduced Graphene Oxide (RGO) Nano Sheets from Natural Graphite Powder Natural graphite, nominally sized at 45 μm, provided by Asbury Carbons (405 Old Main St., Asbury, N.J. 08802, USA) was milled to reduce the size to approximately 14 μm, which was used as the starting material. GO was obtained by following the well-known modified Hummers method, which involved two oxidation stages. In a typical procedure, the first oxidation was achieved in the following conditions: 1100 mg of graphite was placed in a 1000 mL boiling flask. Then, 20 g of $K_2S_2O_8$, 20 g of $P_2O_5$, and 400 mL of a concentrated aqueous solution of $H_2SO_4$ (96%) were added in the flask. The mixture was heated under reflux for 6 hours and then let without disturbing for 20 hours at room temperature. Oxidized graphite was filtered and rinsed with abundant distilled water until neutral pH. A wet cake-like material was recovered at the end of this first oxidation.

For the second oxidation process, the previously collected wet cake was placed in a boiling flask that contains 69 mL of a concentrated aqueous solution of $H_2SO_4$ (96%). The flask was kept in an ice bath as 9 g of $KMnO_4$ was slowly added. Care was taken to avoid overheating. The resulting mixture was stirred at 35° C. for 2 hours (the sample color turning dark green), followed by the addition of 140 mL of water. After 15 min, the reaction was halted by adding 420 mL of water and 15 mL of an aqueous solution of 30 wt % $H_2O_2$. The color of the sample at this stage turned bright yellow. To remove the metallic ions, the mixture was filtered and rinsed with a 1:10 HCl aqueous solution. The collected material was gently centrifuged at 2700 g and rinsed with deionized water. The final product was a wet cake that contained 1.4 wt % of GO, as estimated from dry extracts. Subsequently, liquid dispersions of GO platelets were obtained by lightly sonicating wet-cake materials, which were diluted in deionized water.

Surfactant-stabilized RGO (RGO-BS) was obtained by diluting the wet-cake in an aqueous solution of surfactants instead of pure water. A commercially available mixture of cholate sodium (50 wt. %) and deoxycholate sodium (50 wt. %) salts provided by Sigma Aldrich was used. The surfactant weight fraction was 0.5 wt. %. This fraction was kept constant for all samples. Sonication was performed using a Branson Sonifier S-250A equipped with a 13 mm step disruptor horn and a 3 mm tapered micro-tip, operating at a 20 kHz frequency. For instance, 10 mL of aqueous solutions containing 0.1 wt. % of GO was sonicated for 10 min and subsequently centrifuged at 2700 g for 30 min to remove any non-dissolved large particles, aggregates, and impurities. Chemical reduction of as-obtained GO to yield RGO was conducted by following the method, which involved placing 10 mL of a 0.1 wt. % GO aqueous solution in a boiling flask of 50 mL. Then, 10 μL of a 35 wt. % aqueous solution of $N_2H_4$ (hydrazine) and 70 mL of a 28 wt. % of an aqueous solution of $NH_4OH$ (ammonia) were added to the mixture, which was stabilized by surfactants. The solution was heated to 90° C. and refluxed for 1 h. The pH value measured after the reaction was approximately 9. The color of the sample turned dark black during the reduction reaction.

RGO was used as a conductive additive in either or both of the anode and cathode in certain alkali metal batteries presently invented. Pre-sodiated RGO (e.g. RGO+sodium particles or RGO pre-deposited with sodium coating) was also use as an anode active material in selected sodium-sulfur cells. Pre-lithiated RGO films were also used as an anode active material for the Li—S cells.

For comparison purposes, slurry coating and drying procedures were conducted to produce conventional electrodes. Electrodes and a separator disposed between two electrodes were then assembled and encased in an Al-plastic laminated packaging envelop, followed by liquid electrolyte injection to form a sodium or potassium battery cell.

Example 5: Preparation of Pristine Graphene Sheets (0% Oxygen)

Recognizing the possibility of the high defect population in GO sheets acting to reduce the conductivity of individual graphene plane, we decided to study if the use of pristine graphene sheets (non-oxidized and oxygen-free, non-halogenated and halogen-free, etc.) can lead to a conductive additive having a high electrical and thermal conductivity. Pre-sodiated pristine graphene was also used as an anode active material. Pristine graphene sheets were produced by using the direct ultrasonication or liquid-phase production process.

In a typical procedure, five grams of graphite flakes, ground to approximately 20 μm or less in sizes, were dispersed in 1,000 mL of deionized water (containing 0.1% by weight of a dispersing agent, Zonyl® FSO from DuPont) to obtain a suspension. An ultrasonic energy level of 85 W (Branson S450 Ultrasonicator) was used for exfoliation, separation, and size reduction of graphene sheets for a period of 15 minutes to 2 hours. The resulting graphene sheets are pristine graphene that have never been oxidized and are oxygen-free and relatively defect-free. Pristine graphene is essentially free from any non-carbon elements.

Pristine graphene sheets, as a conductive additive, along with an anode active material (or cathode active material in the cathode) were then incorporated in a battery using both the presently invented procedure of slurry injection into foam pores and conventional procedure of slurry coating, drying and layer laminating. Both alkali metal-ion batteries and alkali metal batteries (injection into cathode only) were investigated. In the latter batteries, primary or secondary, the anode is either Na foil or K chips supported by graphene sheets.

Example 6: Preparation of Pre-Sodiated Graphene Fluoride Sheets as an Anode Active Material of a Sodium-Sulfur Battery Several processes have been used by us to produce graphene fluoride (GF), but only one process is herein described as an example. In a typical procedure, highly exfoliated graphite (HEG) was prepared from intercalated compound $C_2F \cdot xClF_3$. HEG was further fluorinated by vapors of chlorine trifluoride to yield fluorinated highly exfoliated graphite (FHEG). Pre-cooled Teflon reactor was filled with 20-30 mL of liquid pre-cooled $ClF_3$, the reactor was closed and cooled to liquid nitrogen temperature. Then, no more than 1 g of HEG was put in a container with holes for $ClF_3$ gas to access and situated inside the reactor. In 7-10 days a gray-beige product with approximate formula $C_2F$ was formed.

Subsequently, a small amount of FHEG (approximately 0.5 mg) was mixed with 20-30 mL of an organic solvent (methanol and ethanol, separately) and subjected to an ultrasound treatment (280 W) for 30 min, leading to the formation of homogeneous yellowish dispersions. Upon removal of solvent, the dispersion became a brownish powder. The graphene fluoride powder was mixed with sodium chips in a liquid electrolyte, allowing for pre-sodiation to occur before or after injection into pores of an anode current collector.

Example 7: Preparation of Nitrogenataed Graphene Nano Sheets and Porous Graphene Structures Graphene oxide (GO), synthesized in Example 1, was finely ground with different proportions of urea and the pelletized mixture heated in a microwave reactor (900 W) for 30 s. The product was washed several times with deionized water and vacuum dried. In this method graphene oxide gets simultaneously reduced and doped with nitrogen. The products obtained with graphene:urea mass ratios of 1:0.5, 1:1 and 1:2 are designated as NGO-1, NGO-2 and NGO-3 respectively and the nitrogen contents of these samples were 14.7, 18.2 and 17.5 wt % respectively as found by elemental analysis. These nitrogenated graphene sheets remain dispersible in water. Two types of dispersions were then prepared. One involved adding water-soluble polymer (e.g. polyethylene oxide) into the nitrogenated graphene sheet-water dispersion to produce a water-based suspension. The other involved drying the nitrogenated graphene sheet-water dispersion to recover nitrogenated graphene sheets, which were then added into precursor polymer-solvent solutions to obtain organic solvent-based suspensions.

The resulting suspensions were then cast, dried, carbonized and graphitized to produce porous graphene structures. The carbonization temperatures for comparative samples are 900-1,350° C. The graphitization temperatures are from 2,200° C. to 2,950° C. The porous graphene layers are used as the porous current collectors for both the anode and the cathode of Li—S cells.

Example 8: Conductive Web of Filaments from Electro-Spun PAA Fibrils as a Supporting Layer for the Anode Poly (amic acid) (PAA) precursors for spinning were prepared by copolymerizing of pyromellitic dianhydride (Aldrich) and 4,4'-oxydianiline (Aldrich) in a mixed solvent of tetrahydrofurane/methanol (THF/MeOH, 8/2 by weight). The PAA solution was spun into fiber web using an electrostatic spinning apparatus. The apparatus consisted of a 15 kV d.c. power supply equipped with the positively charged capillary from which the polymer solution was extruded, and a negatively charged drum for collecting the fibers. Solvent removal and imidization from PAA were performed concurrently by stepwise heat treatments under air flow at 40° C. for 12 h, 100° C. for 1 h, 250° C. for 2 h, and 350°

C. for 1 h. The thermally cured polyimide (PI) web samples were carbonized at 1,000° C. to obtain carbonized nano-fibers with an average fibril diameter of 67 nm. Such a web can be used as a conductive substrate for an anode active material. We observe that the implementation of a network of conductive nano-filaments at the anode of a Li—S cell can effectively suppress the initiation and growth of lithium dendrites that otherwise could lead to internal shorting.

Example 9: Electrochemical Deposition of S on Various Webs or Paper Structures (External Electrochemical Deposition) for Li—S and Na—S Batteries The electrochemical deposition may be conducted before the cathode active layer is incorporated into an alkali metal-sulfur battery cell (Li—S or Na—S cell). In this approach, the anode, the electrolyte, and the integral layer of porous graphene structure (serving as a cathode layer) are positioned in an external container outside of a lithium-sulfur cell. The needed apparatus is similar to an electro-plating system, which is well-known in the art.

In a typical procedure, a metal polysulfide ($M_xS_y$) is dissolved in a solvent (e.g. mixture of DOL/DME in a volume ratio from 1:3 to 3:1) to form an electrolyte solution. An amount of a lithium salt may be optionally added, but this is not required for external electrochemical deposition. A wide variety of solvents can be utilized for this purpose and there is no theoretical limit to what type of solvents can be used; any solvent can be used provided that there is some solubility of the metal polysulfide in this desired solvent. A greater solubility would mean a larger amount of sulfur can be derived from the electrolyte solution.

The electrolyte solution is then poured into a chamber or reactor under a dry and controlled atmosphere condition (e.g. He or Nitrogen gas). A metal foil can be used as the anode and a layer of the porous graphene structure as the cathode; both being immersed in the electrolyte solution. This configuration constitutes an electrochemical deposition system. The step of electrochemically depositing nano-scaled sulfur particles or coating on the graphene surfaces is conducted at a current density preferably in the range of 1 mA/g to 10 A/g, based on the layer weight of the porous graphene structure.

The chemical reactions that occur in this reactor may be represented by the following equation: $M_xS_y \rightarrow M_xS_{y-z} + zS$ (typically z=1-4). Quite surprisingly, the precipitated S is preferentially nucleated and grown on massive graphene surfaces to form nano-scaled coating or nano particles. The coating thickness or particle diameter and the amount of S coating/particles may be controlled by the specific surface area, electro-chemical reaction current density, temperature and time. In general, a lower current density and lower reaction temperature lead to a more uniform distribution of S and the reactions are easier to control. A longer reaction time leads to a larger amount of S deposited on graphene surfaces and the reaction is ceased when the sulfur source is consumed or when a desired amount of S is deposited. These S-coated paper or web structures were then pulverized into fine particles for use as the cathode active material of a Li—S or Na—S cell.

Example 10: Chemical Reaction-Induced Deposition of Sulfur Particles on Isolated Graphene Sheets Prior to Cathode Layer Preparation A prior art chemical deposition method is herein utilized to prepare S-graphene composites from isolated graphene oxide sheets (i.e. these GO sheets were not packed into an integral structure of porous graphene prior to chemical deposition of S on surfaces of GO sheets). The procedure began with adding 0.58 g $Na_2S$ into a flask that had been filled with 25 ml distilled water to form a $Na_2S$ solution. Then, 0.72 g elemental S was suspended in the $Na_2S$ solution and stirred with a magnetic stirrer for about 2 hours at room temperature. The color of the solution changed slowly to orange-yellow as the sulfur dissolved. After dissolution of the sulfur, a sodium polysulfide ($Na_2S_x$) solution was obtained (x=4-10).

Subsequently, a graphene oxide-sulfur (GO-S) composite was prepared by a chemical deposition method in an aqueous solution. First, 180 mg of graphite oxide was suspended in 180 ml ultrapure water and then sonicated at 50° C. for 5 hours to form a stable graphene oxide (GO) dispersion. Subsequently, the $Na_2S_x$ solution was added to the above-prepared GO dispersions in the presence of 5 wt % surfactant cetyl trimethyl-ammonium bromide (CTAB), the as-prepared GO/$Na_2S_x$ blended solution was sonicated for another 2 hours and then titrated into 100 ml of 2 mol/L HCOOH solution at a rate of 30-40 drops/min and stirred for 2 hours. Finally, the precipitate was filtered and washed with acetone and distilled water several times to eliminate salts and impurities. After filtration, the precipitate was dried at 50° C. in a drying oven for 48 hours. The reaction may be represented by the following reaction: $S_x^{2-} + 2H^+ \rightarrow (x-1)S + H_2S$.

Example 11: Redox Chemical Reaction-Induced Deposition of Sulfur Particles on Isolated Graphene Sheets Prior to Cathode Layer Preparation In this chemical reaction-based deposition process, sodium thiosulfate ($Na_2S_2O_3$) was used as a sulfur source and HCl as a reactant. A GO-water suspension was prepared and then the two reactants (HCl and $Na_2S_2O_3$) were poured into this suspension. The reaction was allowed to proceed at 25-75° C. for 1-3 hours, leading to the precipitation of S particles deposited on surfaces of GO sheets. The reaction may be represented by the following reaction:

$$2HCl + Na_2S_2O_3 \rightarrow 2NaCl + S\downarrow + SO_2\uparrow + H_2O.$$

Example 12: Preparation of S/GO Nanocomposites Via Solution Deposition

GO sheets and S were mixed and dispersed in a solvent ($CS_2$) to form a suspension. After thorough stirring, the solvent was evaporated to yield a solid nanocomposite, which was then ground to yield nanocomposite powder. The primary sulfur particles in these nanocomposite particles have an average diameter of approximately 40-50 nm.

Example 13: Preparation and Electrochemical Testing of Various Battery Cells

For most of the anode and cathode active materials investigated, we prepared alkali metal-sulfur cells or alkali metal ion-sulfur cells using both the presently invented method and the conventional method.

With the conventional method, a typical anode composition includes 85 wt. % active material (e.g., Sn- or $Na_2C_8H_4O_4$-coated graphene sheets for Na ion-sulfur anode; graphite or Si particles for Li ion-sulfur anode), 7 wt. % acetylene black (Super-P), and 8 wt. % polyvinylidene fluoride binder (PVDF, 5 wt. % solid content) dissolved in N-methyl-2-pyrrolidinone (NMP). After coating the slurries on Cu foil, the electrodes were dried at 120° C. in vacuum for 2 h to remove the solvent. Cathode layers are made in a similar manner (using Al foil as the cathode current collector). An anode layer, separator layer (e.g. Celgard 2400 membrane), and a cathode layer are then laminated together and housed in a plastic-Al envelop. The cell is then injected with 1 M $LiPF_6$ or $NaPF_6$ electrolyte solution dissolved in a mixture of ethylene carbonate (EC) and diethyl carbonate (DEC) (EC-DEC, 1:1 v/v). In some cells, ionic liquids were used as the liquid electrolyte. The cell assemblies were made in an argon-filled glove-box.

In the presently invented process, in certain examples, the anode current collector (conductive porous structure for the anode), the separator, and the cathode current collector (conductive porous structure for the cathode side) are assembled in a protective housing before or after the injecting (or impregnation) of the first suspension and/or the injecting (or impregnation) of the second suspension. In some examples, we assembled an empty foamed anode current collector, a porous separator layer, and an empty foamed current collector together to form an assembly that was housed in a pouch (made of Al-nylon bi-layer film). The first suspension was then injected into the anode current collector and the second suspension was injected into the cathode current collector. The pouch was then sealed. In other examples, we impregnated a foamed anode current collector with the first suspension to form an anode layer and, separately, impregnated a foamed cathode current collector with the second suspension to form a cathode layer. The anode layer, a porous separator layer, and the cathode layer were then assembled and housed in a pouch to form a cell. With the instant method, typically no binder resin is needed or used, saving 8% weight (reduced amount of non-active materials).

The cyclic voltammetry (CV) measurements were carried out using an Arbin electrochemical workstation at a typical scanning rate of 1 mV/s. In addition, the electrochemical performances of various cells were also evaluated by galvanostatic charge/discharge cycling at a current density of from 50 mA/g to 10 A/g. For long-term cycling tests, multi-channel battery testers manufactured by LAND were used.

It may be noted that, in lithium-ion battery industry, it is a common practice to define the cycle life of a battery as the number of charge-discharge cycles that the battery suffers 20% decay in capacity based on the initial capacity measured after the required electrochemical formation. The same definition for the cycle life of a Li—S or room temperature Na—S cell is herein followed.

Example 14: Representative Testing Results

Figure 5:
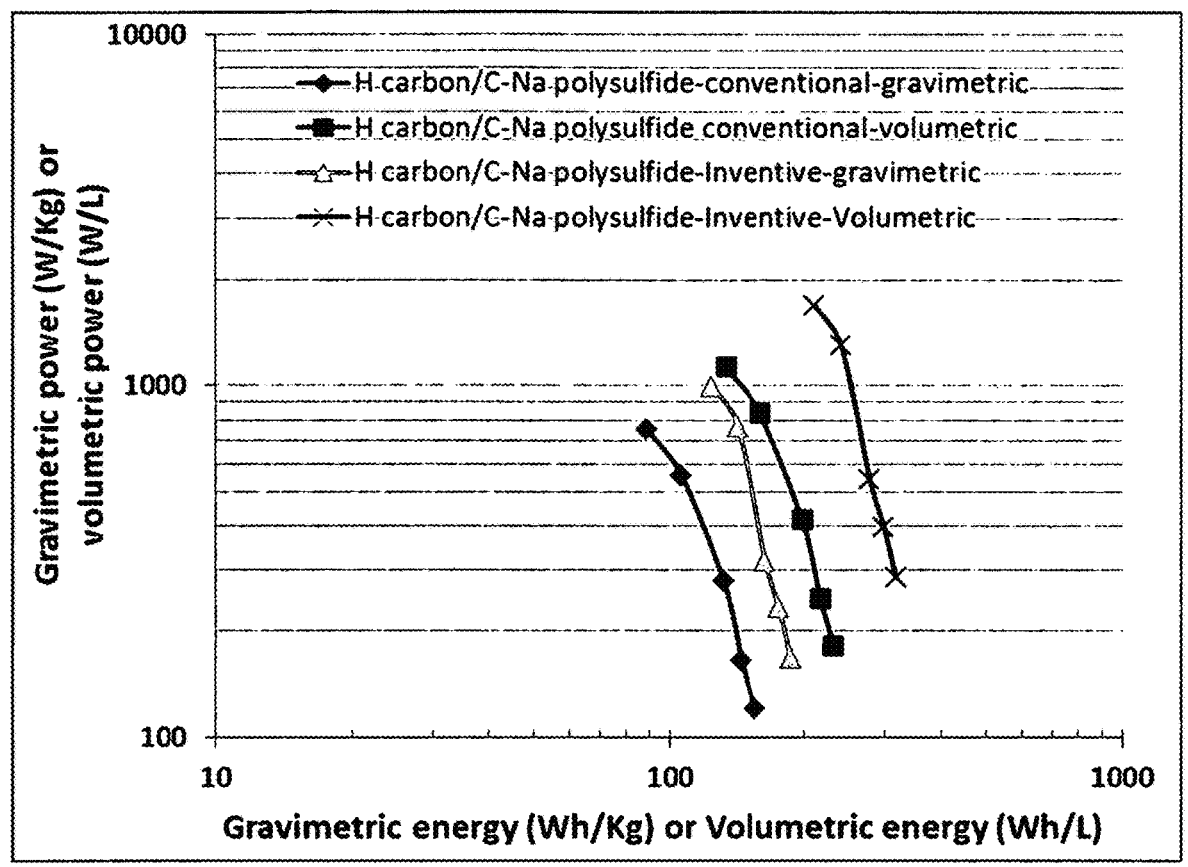
FIG. 5 Ragone plots (gravimetric and volumetric power density vs. energy density) of Na ion-sulfur battery cells containing hard carbon particles as the anode active material and carbon/sodium polysulfide particles as the cathode active materials. Two of the 4 data curves are for the cells prepared according to an embodiment of instant invention and the other two by the conventional slurry coating of electrodes (roll-coating).

For each sample, several current densities (representing charge/discharge rates) were imposed to determine the electrochemical responses, allowing for calculations of energy density and power density values required of the construction of a Ragone plot (power density vs. energy density). Shown in FIG. 5 are Ragone plots (gravimetric and volumetric power density vs. energy density) of Na-ion battery cells containing hard carbon particles as the anode active material and activated carbon/sulfur composite particles as the cathode active materials. Two of the 4 data curves are for the cells prepared according to an embodiment of instant invention and the other two by the conventional slurry coating of electrodes (roll-coating of slurry). Several significant observations can be made from these data:

Both the gravimetric and volumetric energy densities and power densities of the sodium ion-S battery cells prepared by the presently invented method (denoted as "inventive" in the figure legend) are significantly higher than those of their counterparts prepared via the conventional roll-coating method (denoted as "conventional"). A change from an anode thickness of 150 μm (coated on a flat solid Cu foil) to a thickness of 225 μm (all accommodated in pores of a Ni foam having 85% porosity) and a corresponding change in the cathode to maintain a balanced capacity ratio results in a gravimetric energy density increase from 155 Wh/kg to 187 Wh/kg. Even more surprisingly, the volumetric energy density is increased from 232 Wh/L to 318 Wh/L.

These significant differences cannot be simply ascribed to the increases in the electrode thickness and the mass loading. The differences are likely due to the significantly higher active material mass loading (relative to other materials) associated with the presently invented cells, reduced proportion of overhead (non-active) components relative to the active material weight/volume, no need to have a binder resin, surprisingly better utilization of the electrode active material (most, if not all, of the hard carbon particles and C/S particles contributing to the sodium ion storage capacity; no dry pockets or ineffective spots in the electrode, particularly under high charge/discharge rate conditions), and the surprising ability of the inventive method to more effectively pack active material particles in the pores of the foamed current collector.

Figure 6:
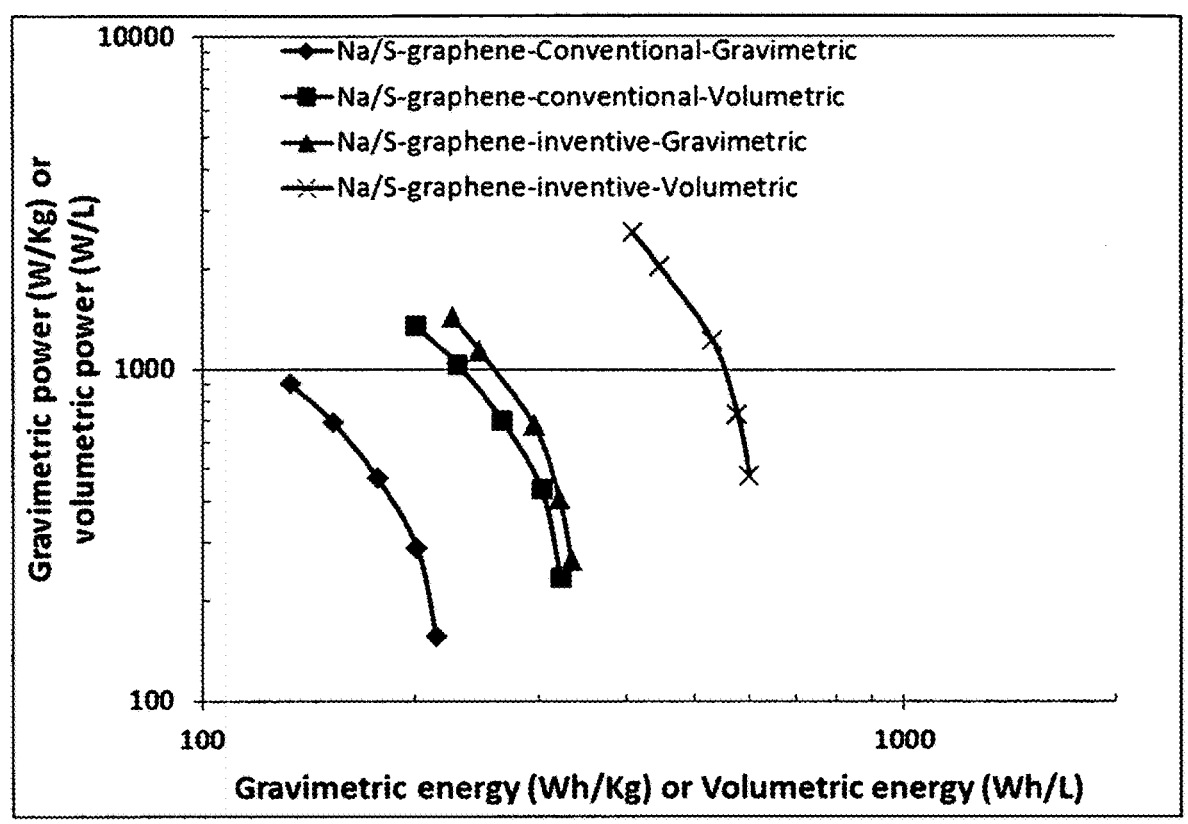
FIG. 6 Ragone plots (both gravimetric and volumetric power density vs. gravimetric and volumetric energy density) of two Na—S cells, both containing graphene-embraced Na nano particles as the anode active material and sulfur coated on graphene sheets as the cathode active material. The data are for both sodium ion cells prepared by the presently invented method and those by the conventional slurry coating of electrodes.

FIG. 6 shows the Ragone plots (both gravimetric and volumetric power density vs. gravimetric and volumetric energy density) of two cells, both containing graphene-embraced Na nano particles as the anode active material and S-coated graphene sheets as the cathode active material. The experimental data were obtained from the battery cells that were prepared by the presently invented method and those by the conventional slurry coating of electrodes.

These data indicate that both the gravimetric and volumetric energy densities and power densities of the battery cells prepared by the presently invented method are significantly higher than those of their counterparts prepared via the conventional method. Again, the differences are huge. The conventionally made cells exhibit a gravimetric energy density of 215 Wh/kg and volumetric energy density of 323 Wh/L, but the presently invented cells deliver 334 Wh/kg and 601 Wh/L, respectively. The cell-level volumetric energy density of 601 Wh/L has never been previously achieved with any rechargeable sodium batteries. The power densities as high as 1432 W/kg and 2,578 W/L are also unprecedented for typically higher-energy lithium-ion batteries, let alone for sodium-ion batteries.

These energy density and power density differences are mainly due to the high active material mass loading (>25 $mg/cm^2$ in the anode and >35 $mg/cm^2$ in the cathode) associated with the presently invented cells, reduced proportion of overhead (non-active) components relative to the active material weight/volume, no need to have a binder resin, the ability of the inventive method to better utilize the active material particles (all particles being accessible to liquid electrolyte and fast ion and electron kinetics), and to more effectively pack active material particles in the pores of the foamed current collectors.

Figure 7:
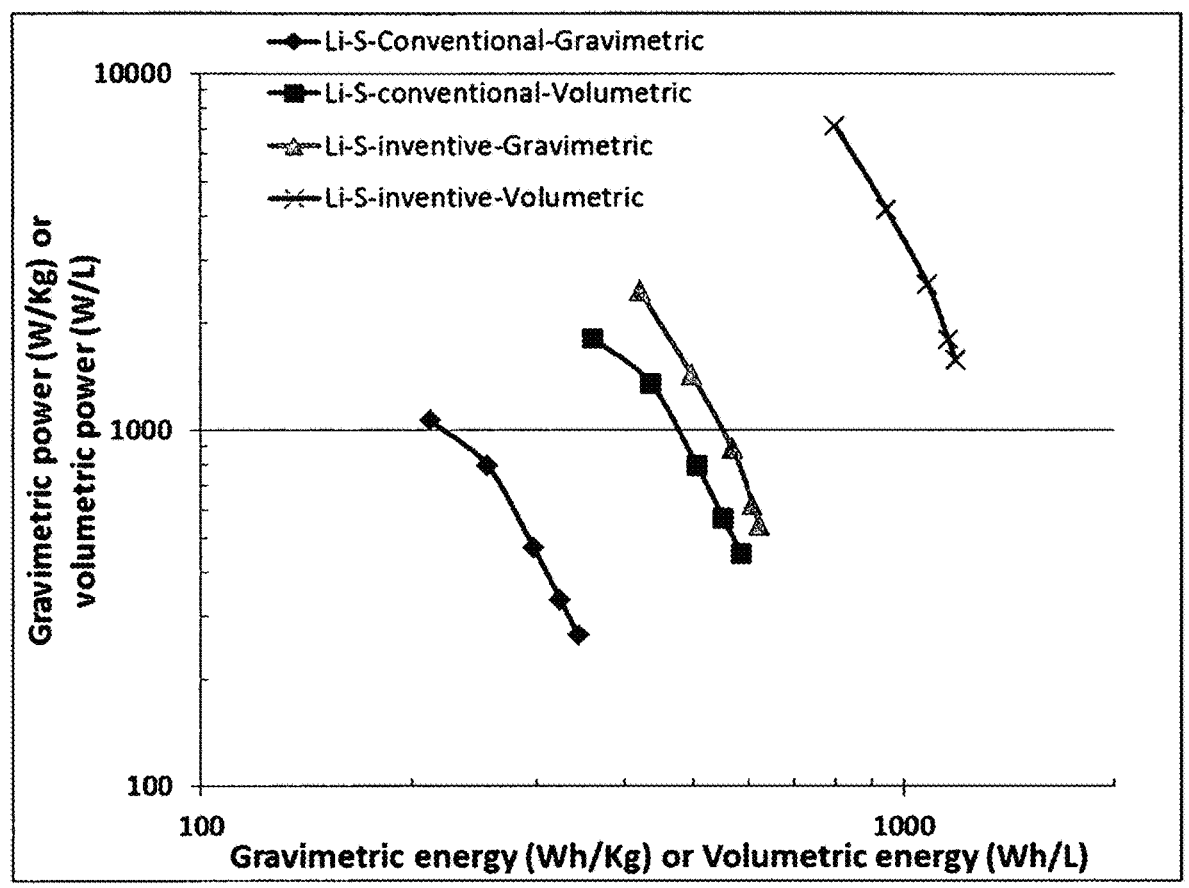
FIG. 7 Ragone plots of Li—S batteries containing a lithium foil as the anode active material, graphene sheet-supported sulfur as the cathode active material, and lithium salt (LiPF$_6$)—PC/DEC as organic liquid electrolyte. The data are for both lithium metal-sulfur cells prepared by the presently invented method and those by the conventional slurry coating of electrodes.

Shown in FIG. 7 are Ragone plots of Li—S batteries containing a lithium foil as the anode active material, S-coated graphene sheets as the cathode active material, and lithium salt ($LiaPF_6$)-PC/DEC as organic liquid electrolyte. The data are for both sodium metal cells prepared by the presently invented method and those by the conventional slurry coating of electrodes. These data indicate that both the gravimetric and volumetric energy densities and power densities of the sodium metal cells prepared by the presently invented method are significantly higher than those of their counterparts prepared via the conventional method. Again, the differences are huge and are likely due to the significantly higher active material mass loading associated with the presently invented cells, reduced proportion of overhead (non-active) components relative to the active material weight/volume, no need to have a binder resin, surprisingly better utilization of the electrode active material (most, if not all, of the active material contributing to the sodium ion storage capacity; no dry pockets or ineffective spots in the electrode, particularly under high charge/discharge rate conditions), and the surprising ability of the inventive method to more effectively pack active material particles in the pores of the foamed current collector.

Quite noteworthy and unexpected is the observation that the cell-level gravimetric energy density of the presently invented Li—S cell is as high as 624 Wh/kg, higher than those of all rechargeable lithium metal or lithium-ion batteries ever reported (recall that current Li-ion batteries typically store 150-250 Wh/kg based on the total cell weight and 500-650 Wh/L per cell volume). Furthermore, for sulfur cathode active material-based lithium batteries, a volumetric energy density of 1,185 Wh/L, a gravimetric power density of 2,457 W/kg and volumetric power density of 4,668 W/L would have been un-thinkable.

It is of significance to point out that reporting the energy and power densities per weight of active material alone on a Ragone plot, as did by many researchers, may not give a realistic picture of the performance of the assembled battery cell. The weights of other device components also must be taken into account. These overhead components, including current collectors, electrolyte, separator, binder, connectors, and packaging, are non-active materials and do not contribute to the charge storage amounts. They only add weights and volumes to the device. Hence, it is desirable to reduce the relative proportion of overhead component weights and increase the active material proportion. However, it has not been possible to achieve this objective using conventional battery production processes. The present invention overcomes this long-standing, most serious problem in the art of lithium batteries.

In commercial lithium-ion batteries having an electrode thickness of 150 µm, the weight proportion of the anode active material (e.g. graphite or carbon) in a lithium-ion battery is typically from 12% to 17%, and that of the cathode active material (for inorganic material, such as $LiMn_2O_4$) from 22% to 41%, or from 10% to 15% for organic or polymeric. The corresponding weight fractions in Na-ion batteries are expected to be very similar since both the anode active materials and cathode active materials have similar physical densities between two types of batteries and the ratio of cathode specific capacity to the anode specific capacity is also similar. Hence, a factor of 3 to 4 may be used to extrapolate the energy or power densities of the device (cell) from the properties based on the active material weight alone. In most of the scientific papers, the properties reported are typically based on the active material weight alone and the electrodes are typically very thin (<<100 µm and mostly <<50 µm). The active material weight is typically from 5% to 10% of the total device weight, which implies that the actual cell (device) energy or power densities may be obtained by dividing the corresponding active material weight-based values by a factor of 10 to 20. After this factor is taken into account, the properties reported in these papers do not really look any better than those of commercial batteries. Thus, one must be very careful when it comes to read and interpret the performance data of batteries reported in the scientific papers and patent applications.

Figure 8:
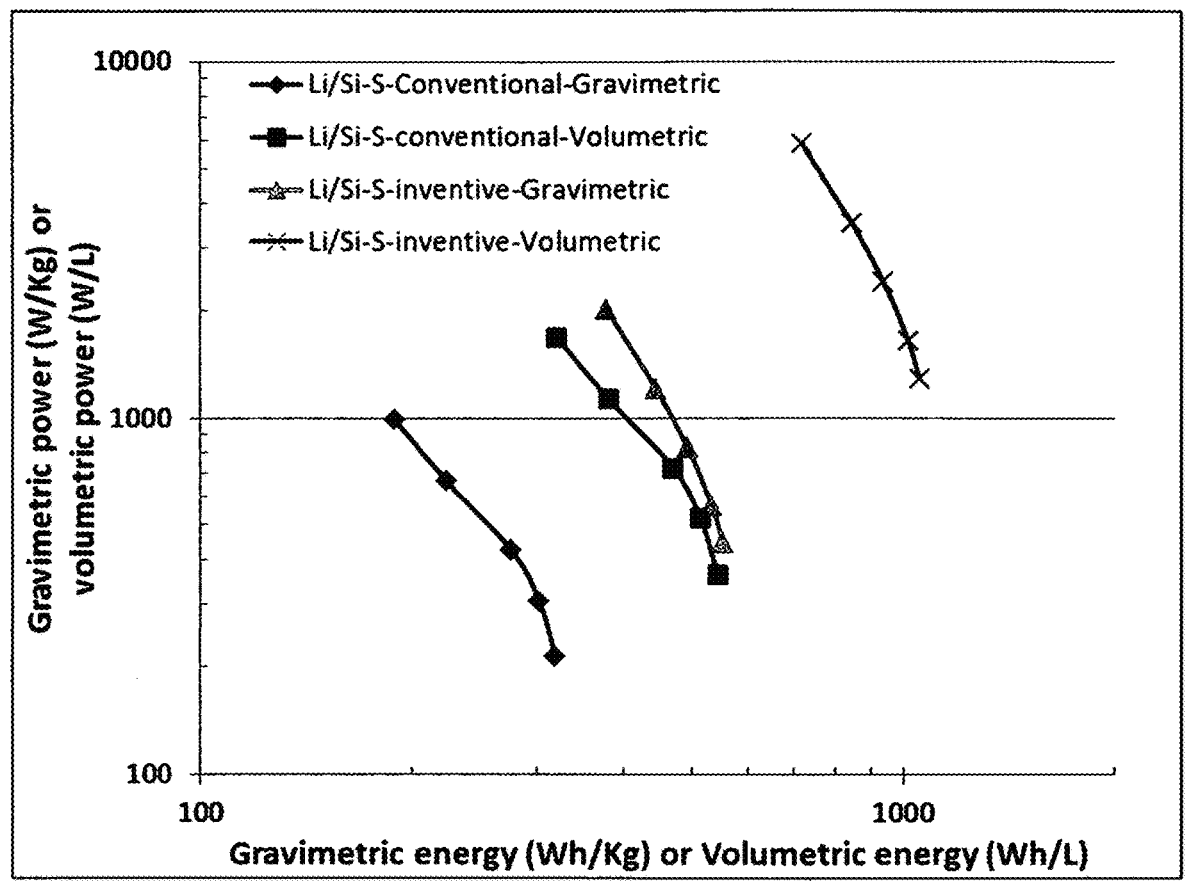
FIG. 8 Ragone plot of a series of Li ion-S cells (graphene-wrapped Si nano particles) prepared by the conventional slurry coating process and the Ragone plot of corresponding cells prepared by the presently invented process.

FIG. 8 shows the Ragone plot of a series of Li ion-S cells (graphene-wrapped Si nano particles, or pre-lithiated Si nano particles) prepared by the conventional slurry coating process and the Ragone plot of corresponding cells prepared by the presently invented process. These data again demonstrate the effectiveness of the presently invented process in imparting unexpectedly high energy densities, both gravimetric and volumetric, to the Li—S battery cells.

Example 15: Achievable Electrode Thickness and its Effect on Electrochemical Performance of Lithium Battery Cells One might be tempted to think the electrode thickness of an alkali metal battery is a design parameter that can be freely adjusted for optimization of device performance. Contrary to this perception, in reality, the alkali metal battery electrode thickness is manufacturing-limited and one cannot produce electrodes of good structural integrity that exceed certain thickness level in a real industrial manufacturing environment (e.g. a roll-to-roll coating facility). The conventional battery electrode design is based on coating an electrode layer on a flat metal current collector, which has several major problems: (a) A thick coating on Cu foil or Al foil requires a long drying time (requiring a heating zone 30-100 meters long). (b) Thick electrodes tend to get delaminated or cracked upon drying and subsequent handling, and even with a resin binder proportion as high as 15-20% to hopefully improve the electrode integrity this problem remains a major limiting factor. Thus, such an industry practice of roll-coating of slurry on a solid flat current collector does not allow for high active material mass loadings. (c) A thick electrode prepared by coating, drying, and compression makes it difficult for electrolyte (injected into a cell after the cell is made) to permeate through the electrode and, as such, a thick electrode would mean many dry pockets or spots that are not wetted by the electrolyte. This would imply a poor utilization of the active materials. The instant invention solves these long-standing, critically important issues associated with alkali metal batteries.

Figure 9:
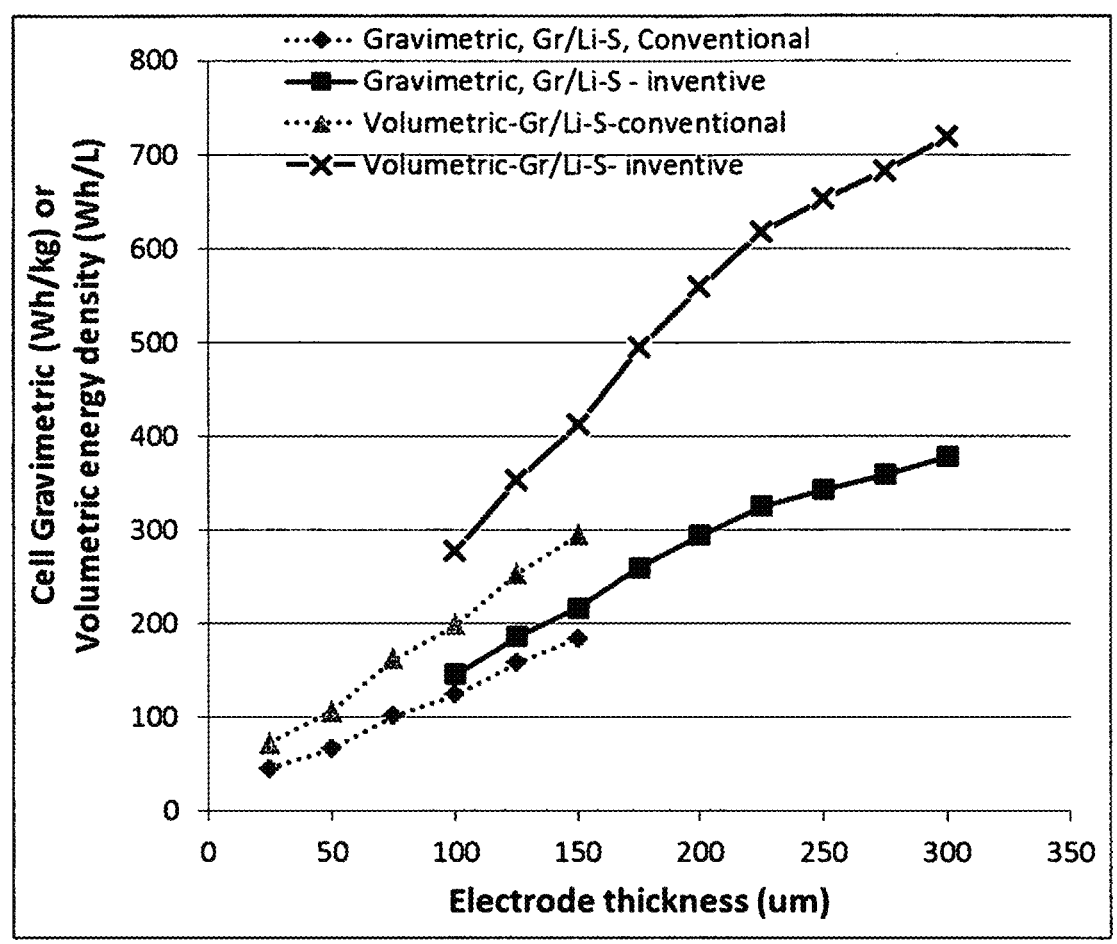
FIG. 9 The cell-level gravimetric (Wh/kg) and volumetric energy densities (Wh/L) of Li ion-S cell (Pre-lithiated graphite anode+graphene-supported S cathode) plotted over the achievable cathode thickness range of the S/RGO cathode prepared via the conventional method without delamination and cracking and those by the presently invented method.

Shown in FIG. 9 are the cell-level gravimetric (Wh/kg) and volumetric energy densities (Wh/L) of Li ion-S cells (Pre-lithiated graphite anode+RGO-supported S cathode) plotted over the achievable cathode thickness range of the S/RGO cathode prepared via the conventional method without delamination and cracking and those by the presently invented method.

The electrodes can be fabricated up to a thickness of 100-200 µm using the conventional slurry coating process. However, in contrast, there is no theoretical limit on the electrode thickness that can be achieved with the presently invented method. Typically, the practical electrode thickness is from 10 µm to 1000 µm, more typically from 100 µm to 800 µm, and most typically from 200 µm to 600 µm.

These data further confirm the surprising effectiveness of the presently invented method in producing ultra-thick lithium or sodium battery electrodes not previously achievable. These ultra-thick electrodes in sodium metal batteries lead to exceptionally high sulfur cathode active material mass loading, typically significantly >15 mg/cm$^2$ (more typically >20 mg/cm$^2$, further typically >30 mg/cm$^2$, often >40 mg/cm$^2$, and even >50 mg/cm$^2$). These high active material mass loadings have not been possible to obtain with conventional alkali metal-sulfur batteries made by the slurry coating processes. These high active material mass loadings led to exceptionally high gravimetric and volumetric energy densities that otherwise have not been previously achieved given the same battery system.

Dendrite issues commonly associated with Li, Na, and K metal secondary cells are also resolved by using the presently invented foamed current collector strategy. Hundreds of cells have been investigated and those cells having a foamed anode current collector were not found to fail due to dendrite penetration through the separator. SEM examination of samples from presently invented sodium and potassium cells confirms that the re-deposited alkali metal surfaces on pore walls in a porous anode current collector appear to be smooth and uniform, exhibiting no sign of sharp metal deposit or tree-like features as often observed with corresponding cells having a solid current collector (Cu foil) at the anode. This might be due to a reduced exchange current density associated with a high specific surface area of the foamed current collector at the anode and a more uniform local electric field in such a foamed structure that drives the alkali metal deposition during repeated re-charge procedures.

The invention claimed is:

1. A process for producing an alkali metal-sulfur battery, wherein said alkali metal is selected from lithium (Li) and/or sodium (Na), said process comprising:
 (a) preparing a first conductive porous structure or first conductive foam layer;
 (b) preparing a second conductive porous structure or second conductive foam layer;
 (c) injecting or impregnating a first suspension into pores of said first conductive porous structure to form an anode electrode, wherein said first suspension contains an anode active material, a conductive additive, and a first liquid or gel electrolyte and wherein said anode electrode and said first conductive porous structure are of like shape and dimensions;
 (d) injecting or impregnating a second suspension into pores of said second conductive porous structure to form a cathode electrode, wherein said second suspension contains a cathode active material, a conductive additive, and a second liquid or gel electrolyte, wherein said cathode active material is selected from sulfur, lithium polysulfide, sodium polysulfide, sulfur-polymer composite, organo-sulfide, sulfur-carbon composite, sulfur-graphene composite, or a combination thereof; and wherein said cathode electrode and said second conductive porous structure are of like shape and dimensions; and
 (e) assembling said anode electrode, a separator, and a cathode electrode into said alkali metal-sulfur battery, wherein there is no drying to said anode electrode and no drying to said cathode electrode during said process.

2. The process of claim 1, wherein said step (a), (b), (c), (d), and (e) are conducted in the following sequence:
 (A) preparing said first suspension and said second suspension;
 (B) assembling a porous cell framework composed of said first conductive porous structure as a porous anode current collector, said second conductive porous structure as a porous cathode current collector, and a porous separator disposed between said porous anode current collector and said porous cathode current collector; wherein said porous anode current collector and/or said porous cathode current collector has a thickness no less than 200 µm and at least 70% by volume of pores; and
 (C) injecting said first suspension into pores of said anode current collector to form said anode electrode and injecting said second suspension into pores of said cathode current collector to form said cathode electrode to an extent that said anode active material has a material mass loading no less than 10 mg/cm$^2$ in said anode electrode or said cathode active material has a material mass loading no less than 15 mg/cm$^2$ in said cathode electrode;
 wherein said anode current collector, said separator, and said cathode current collector are assembled in a protective housing before or after said injection or impregnation of first suspension and/or said injection or impregnation of second suspension.

3. The process of claim 1, wherein said step (a), (b), (c), (d), and (e) are conducted in the following sequence:
 (A) preparing one or a plurality of electrically conductive porous layers, one or a plurality of wet anode layers of said first suspension, and one or a plurality of wet cathode layers of said second suspension, wherein said conductive porous layers contain interconnected conductive pathways and at least 70% by volume of pores;
 (B) stacking and consolidating a desired number of said porous layers and a desired number of said wet anode layers in a sequence to form said anode electrode having a thickness no less than 200 µm;
 (C) placing said porous separator layer in contact with said anode electrode;
 (D) stacking and consolidating a desired number of said porous layers and a desired number of said wet cathode layers in a sequence to form said cathode electrode in contact with said porous separator, wherein said cathode electrode has a thickness no less than 200 µm; and
 (E) assembling and sealing said anode electrode, porous separator, and cathode electrode in a housing to produce said alkali metal-sulfur battery;
 wherein said anode active material has a material mass loading no less than 20 mg/cm$^2$ in said anode electrode and/or said cathode active material has a material mass loading no less than 10 mg/cm$^2$ in said cathode electrode.

4. The process of claim 1, wherein said cathode active material is selected from sulfur bonded to pore walls of said cathode current collector, sulfur bonded to or confined by a carbon or graphite material, sulfur bonded to or confined by a polymer, sulfur-carbon compound, metal sulfide $M_xS_y$, wherein x is an integer from 1 to 3 and y is an integer from 1 to 10, and M is a metal element selected from Li, Na, K, Mg, Ca, a transition metal, a metal from groups 13 to 17 of the periodic table, or a combination thereof.

5. The process of claim 1, wherein said conductive porous structures are selected from metal foam, metal web or screen, perforated metal sheet-based structure, metal fiber mat, metal nanowire mat, conductive polymer nano-fiber mat, conductive polymer foam, conductive polymer-coated fiber foam, carbon foam, graphite foam, carbon aerogel, carbon xerogel, graphene foam, graphene oxide foam, reduced graphene oxide foam, carbon fiber foam, graphite fiber foam, exfoliated graphite foam, or a combination thereof.

6. The process of claim 1, wherein a cathode thickness-to-cathode current collector thickness ratio is from 0.8/1 to 1/0.8, and/or said cathode active material constitutes an electrode active material loading greater than 15 mg/cm$^2$, and said cathode current collector has a thickness no less than 300 μm.

7. The process of claim 1, wherein said cathode active material is supported by a functional material or nano-structured material selected from the group consisting of:
   (A) a nano-structured or porous disordered carbon material selected from particles of a soft carbon, hard carbon, polymeric carbon or carbonized resin, mesophase carbon, coke, carbonized pitch, carbon black, activated carbon, nano-cellular carbon foam or partially graphitized carbon;
   (B) a nano graphene platelet selected from a single-layer graphene sheet or multi-layer graphene platelet;
   (C) a carbon nanotube selected from a single-walled carbon nanotube or multi-walled carbon nanotube;
   (D) a carbon nano-fiber, nano-wire, metal oxide nano-wire or fiber, conductive polymer nano-fiber, or a combination thereof;
   (E) a carbonyl-containing organic or polymeric molecule;
   (F) a functional material containing a carbonyl, carboxylic, or amine group to reversibly capture sulfur;
   and combinations thereof.

8. The process of claim 1, wherein said anode active material contains an alkali ion source selected from an alkali metal, an alkali metal alloy, a mixture of alkali metal or alkali metal alloy with an alkali intercalation compound, an alkali element-containing compound, or a combination thereof.

9. The process of claim 1, wherein said anode active material contains an alkali intercalation compound selected from petroleum coke, carbon black, amorphous carbon, activated carbon, hard carbon, soft carbon, templated carbon, hollow carbon nanowires, hollow carbon sphere, natural graphite, artificial graphite, lithium or sodium titanate, NaTi$_2$(PO$_4$)$_3$, Na$_2$Ti$_3$O$_7$, Na$_2$C$_8$H$_4$O$_4$, Na$_2$TP, Na$_x$TiO$_2$ (x=0.2 to 1.0), Na$_2$C$_8$H$_4$O$_4$, carboxylate based materials, C$_8$H$_4$Na$_2$O$_4$, C$_8$H$_6$O$_4$, C$_8$H$_5$NaO$_4$, C$_8$Na$_2$F$_4$O$_4$, C$_{10}$H$_2$Na$_4$O$_8$, C$_{14}$H$_4$O$_6$, C$_{14}$H$_4$Na$_4$O$_8$, or a combination thereof.

10. The process of claim 1, wherein said anode active material contains an alkali intercalation compound or alkali-containing compound selected from the following groups of materials:
   (A) lithium- or sodium-doped silicon (Si), germanium (Ge), tin (Sn), lead (Pb), antimony (Sb), bismuth (Bi), zinc (Zn), aluminum (Al), titanium (Ti), cobalt (Co), nickel (Ni), manganese (Mn), cadmium (Cd), and mixtures thereof;
   (B) lithium- or sodium-containing alloys or intermetallic compounds of Si, Ge, Sn, Pb, Sb, Bi, Zn, Al, Ti, Co, Ni, Mn, Cd, and their mixtures;
   (C) lithium- or sodium-containing oxides, carbides, nitrides, sulfides, phosphides, selenides, tellurides, or antimonides of Si, Ge, Sn, Pb, Sb, Bi, Zn, Al, Fe, Ti, Co, Ni, Mn, Cd, and mixtures or composites thereof;
   (D) lithium or sodium salts; and
   (E) graphene sheets pre-loaded with lithium or sodium.

11. The process of claim 10, wherein said the graphene sheets pre-loaded with lithium or sodium are selected from pre-sodiated or pre-lithiated versions of pristine graphene, graphene oxide, reduced graphene oxide, graphene fluoride, graphene chloride, graphene bromide, graphene iodide, hydrogenated graphene, nitrogenated graphene, boron-doped graphene, nitrogen-doped graphene, chemically functionalized graphene, a physically or chemically activated or etched version thereof, or a combination thereof.

12. The process of claim 1, wherein said first or second liquid or gel electrolyte is selected from aqueous electrolyte, an organic electrolyte, ionic liquid electrolyte, mixture of an organic electrolyte and an ionic electrolyte, or a mixture thereof with a polymer.

13. The process of claim 12, wherein said aqueous electrolyte contains a sodium salt or a lithium salt dissolved in water or a mixture of water and alcohol.

14. The process of claim 13, wherein said sodium salt or lithium salt is selected from Na$_2$SO$_4$, Li$_2$SO$_4$, a mixture thereof, NaOH, LiOH, NaCl, LiCl, NaF, LiF, NaBr, LiBr, NaI, LiI, or a mixture thereof.

15. The process of claim 12, wherein said organic electrolyte contains a liquid organic solvent selected from the group consisting of 1,3-dioxolane (DOL), 1,2-dimethoxy-ethane (DME), tetraethylene glycol dimethylether (TEGDME), poly(ethylene glycol) dimethyl ether (PEGDME), diethylene glycol dibutyl ether (DEGDBE), 2-ethoxyethyl ether (EEE), sulfone, sulfolane, ethylene carbonate (EC), dimethyl carbonate (DMC), methylethyl carbonate (MEC), diethyl carbonate (DEC), ethyl propionate, methyl propionate, propylene carbonate (PC), gamma-butyrolactone (γ-BL), acetonitrile (AN), ethyl acetate (EA), propyl formate (PF), methyl formate (MF), toluene, xylene, methyl acetate (MA), fluoroethylene carbonate (FEC), vinylene carbonate (VC), allyl ethyl carbonate (AEC), a hydrofloroether, and combinations thereof.

16. The process of claim 12, wherein said organic electrolyte contains an alkali metal salt selected from lithium perchlorate (LiClO$_4$), lithium hexafluorophosphate (LiPF$_6$), lithium borofluoride (LiBF$_4$), lithium hexafluoroarsenide (LiAsF$_6$), lithium trifluoro-methanesulfonate (LiCF$_3$SO$_3$), bis-trifluoromethyl sulfonylimide lithium (LiN(CF$_3$SO$_2$)$_2$, lithium bis(oxalato)borate (LiBOB), lithium oxalyldifluoroborate (LiBF$_2$C$_2$O$_4$), lithium nitrate (LiNO$_3$), li-fluoroalkyl-phosphates (LiPF3(CF$_2$CF$_3$)$_3$), lithium bisperfluoro-ethysulfonylimide (LiBETI), sodium perchlorate (NaClO$_4$), potassium perchlorate (KClO$_4$), sodium hexafluorophosphate (NaPF$_6$), potassium hexafluorophosphate (KPF$_6$), sodium borofluoride (NaBF$_4$), potassium borofluoride (KBF$_4$), sodium hexafluoroarsenide, potassium hexafluoroarsenide, sodium trifluoro-methanesulfonate (NaCF$_3$SO$_3$), potassium trifluoro-methanesulfonate (KCF$_3$SO$_3$), bis-trifluoromethyl sulfonylimide sodium (NaN(CF$_3$SO$_2$)$_2$), sodium trifluoromethanesulfonimide (NaTFSI), bis-trifluoromethyl sulfonylimide potassium (KN(CF$_3$SO$_2$)$_2$), or a combination thereof.

17. The process of claim 12, wherein said ionic liquid electrolyte contains an ionic liquid solvent selected from a room temperature ionic liquid having a cation selected from tetraalkylammonium, di-, tri-, or tetra-alkylimidazolium, alkylpyridinium, dialkyl-pyrrolidinium, dialkylpiperidinium, tetraalkylphosphonium, trialkylsulfonium, or a combination thereof.

18. The process of claim 17, wherein said ionic liquid solvent is selected from a room temperature ionic liquid having an anion selected from BF$_4^-$, B(CN)$_4^-$, CH$_3$BF$_3^-$, CH$_2$CHBF$_3^-$, CF$_3$BF$_3^-$, C$_2$F$_5$BF$_3^-$, n-C$_3$F$_7$BF$_3^-$, n-C$_4$F$_9$BF$_3^-$, PF$_6^-$, CF$_3$CO$_2^-$, CF$_3$SO$_3^-$, N(SO$_2$CF$_3$)$_2^-$, N(COCF$_3$)(SO$_2$CF$_3$)$^-$, N(SO$_2$F)$_2^-$, N(CN)$_2^-$, C(CN)$_3^-$, SCN$^-$, SeCN$^-$, CuCl$_2^-$, AlCl$_4^-$, F(HF)$_{2.3}^-$, or a combination thereof.

* * * * *